(12) United States Patent
Hartman

(10) Patent No.: US 10,998,851 B2
(45) Date of Patent: *May 4, 2021

(54) PANEL MAINTENANCE SYSTEM

(71) Applicant: Philip Hartman, Windsor, CO (US)

(72) Inventor: Philip Hartman, Windsor, CO (US)

(73) Assignee: Steam Tech, LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/722,783

(22) Filed: Dec. 20, 2019

(65) Prior Publication Data

US 2020/0136553 A1 Apr. 30, 2020

Related U.S. Application Data

(63) Continuation of application No. 14/846,906, filed on Sep. 7, 2015, now Pat. No. 10,587,218.

(51) Int. Cl.
*H02S 40/10* (2014.01)
*B08B 1/00* (2006.01)
(Continued)

(52) U.S. Cl.
CPC .............. *H02S 40/10* (2014.12); *B08B 1/002* (2013.01); *B08B 1/005* (2013.01); *B08B 1/008* (2013.01);
(Continued)

(58) Field of Classification Search
None
See application file for complete search history.

(56) References Cited

U.S. PATENT DOCUMENTS 2,576,198 A 11/1951 Stuart
3,793,670 A 2/1974 Riester et al.
(Continued)

FOREIGN PATENT DOCUMENTS

CN 203124355 8/2013
CN 103693019 A 4/2014
(Continued)

OTHER PUBLICATIONS

Corresponding Egyptian Patent Application No. 2018020347; Office Action dated Jul. 15, 2020; 4 pages.
(Continued)

*Primary Examiner* — Michael E Barr
*Assistant Examiner* — Jason P Riggleman
(74) *Attorney, Agent, or Firm* — Craig R. Miles; CR Miles P.C.

(57) ABSTRACT

Generally, a panel maintenance system including a panel maintenance assembly configured to move over a plurality of panel modules. Specifically, a panel module including a first frame including a first plurality of frame members joined to enclose a first panel. The first plurality of frame members including a first frame inner side configured to capture the first panel within the first frame and a first frame outer side configured to provide a first track axially extending between first and second ends of at least one of the first plurality of frame members. The first track configured to engage a drive element of a panel maintenance assembly which operates to move the panel maintenance assembly over the first panel. The panel maintenance assembly bears one or more components which function to maintain the first panel.

19 Claims, 21 Drawing Sheets

(51) Int. Cl.
*F24S 40/20* (2018.01)
*B08B 3/02* (2006.01)
*A46B 13/02* (2006.01)

(52) U.S. Cl.
CPC .............. *B08B 3/024* (2013.01); *F24S 40/20* (2018.05); *A46B 13/02* (2013.01); *B08B 2203/0229* (2013.01); *Y02E 10/40* (2013.01)

(56) References Cited

U.S. PATENT DOCUMENTS

| | | |
|---|---|---|
| 3,881,212 A | 5/1975 | Regler |
| 5,065,471 A | 11/1991 | Laplante |
| 5,235,720 A | 8/1993 | Kinder |
| 5,539,951 A | 7/1996 | Guell et al. |
| 5,699,581 A | 12/1997 | Heneghan et al. |
| 5,778,483 A | 7/1998 | Dawson |
| 5,819,360 A | 10/1998 | Fujii |
| 5,957,384 A | 9/1999 | Lansinger |
| 5,979,010 A | 11/1999 | Dockery et al. |
| 6,076,216 A | 6/2000 | Biryukov |
| 6,100,499 A | 8/2000 | Davila, Sr. |
| 6,119,300 A | 9/2000 | Schmid et al. |
| 6,133,546 A | 10/2000 | Bains |
| 6,140,608 A | 10/2000 | Stingone, Jr. |
| 6,199,300 B1 | 3/2001 | Heater et al. |
| 6,675,434 B1 | 1/2004 | Wilhelm et al. |
| 6,766,553 B2 | 7/2004 | Wilson |
| 6,836,924 B2 | 1/2005 | Egan-Walter |
| 6,892,417 B2 | 5/2005 | Franco et al. |
| 7,592,537 B1 | 9/2009 | West |
| 7,707,681 B1 | 5/2010 | Cabak |
| 8,157,187 B2 | 4/2012 | Shank et al. |
| 8,225,455 B1 | 7/2012 | Blus et al. |
| 8,240,320 B2 | 8/2012 | Mertins et al. |
| 8,301,020 B2 | 10/2012 | Wildegger |
| 8,381,348 B2 | 2/2013 | Egner-Walter et al. |
| 8,391,695 B2 | 3/2013 | Arkashevski et al. |
| 8,550,147 B2 | 10/2013 | Lansinger |
| 8,726,458 B1 | 5/2014 | Mahr et al. |
| 8,756,739 B1 | 6/2014 | Potter et al. |
| 8,771,432 B2 | 7/2014 | Meller et al. |
| D727,238 S | 4/2015 | Lepper et al. |
| 9,192,966 B2 | 11/2015 | Zanatta |
| 9,387,831 B2 | 7/2016 | Hartman |
| 9,440,621 B2 | 9/2016 | Egner-Walter et al. |
| 9,443,992 B2 | 9/2016 | Adler et al. |
| 9,452,736 B2 | 9/2016 | Egner-Walter et al. |
| 9,511,748 B2 | 12/2016 | Piotrowski et al. |
| 10,023,154 B2 | 7/2018 | Piotrowski et al. |
| 10,384,654 B2 | 8/2019 | Hartman |
| 10,587,218 B2 * | 3/2020 | Hartman ................. B08B 1/005 |
| 2002/0066473 A1 | 6/2002 | Levy et al. |
| 2002/0137455 A1 | 9/2002 | Ivanov et al. |
| 2004/0045587 A1 | 3/2004 | Franco et al. |
| 2007/0174989 A1 | 8/2007 | Moll et al. |
| 2008/0216274 A1 | 9/2008 | Egner-Walter |
| 2009/0151107 A1 | 6/2009 | Shank et al. |
| 2009/0172907 A1 | 7/2009 | Egner-Walter et al. |
| 2009/0283605 A1 | 11/2009 | Arkashevski et al. |
| 2010/0037415 A1 | 2/2010 | Lansinger |
| 2010/0043851 A1 | 2/2010 | Levy et al. |
| 2010/0293729 A1 | 11/2010 | Lee |
| 2011/0000525 A1 | 1/2011 | Wu et al. |
| 2011/0047738 A1 | 3/2011 | Gross et al. |
| 2011/0073143 A1 | 3/2011 | Levy et al. |
| 2011/0094542 A1 | 4/2011 | Gonzalez Rodriguez et al. |
| 2011/0094549 A1 | 4/2011 | Lin |
| 2011/0126378 A1 | 6/2011 | Ota |
| 2011/0167577 A1 | 7/2011 | Egner-Walter et al. |
| 2011/0185531 A1 | 8/2011 | Egner-Walter et al. |
| 2012/0005855 A1 | 1/2012 | Egner-Walter et al. |
| 2012/0120641 A1 | 5/2012 | Yassa |
| 2012/0125367 A1 | 5/2012 | Monkman et al. |
| 2012/0198646 A1 | 8/2012 | Kempfer et al. |
| 2012/0285516 A1 | 11/2012 | Mckarris |
| 2013/0097790 A1 | 4/2013 | Liao |
| 2013/0240005 A1 | 9/2013 | Ho et al. |
| 2013/0306106 A1 | 11/2013 | Meller et al. |
| 2014/0007904 A1 | 1/2014 | Shapira et al. |
| 2014/0041138 A1 | 2/2014 | Adler et al. |
| 2014/0082879 A1 | 3/2014 | Criel et al. |
| 2014/0202492 A1 * | 7/2014 | Grossman ............. A47L 7/0004 134/6 |
| 2014/0209145 A1 | 7/2014 | Ting et al. |
| 2014/0209146 A1 | 7/2014 | Park et al. |
| 2014/0331434 A1 | 11/2014 | Shimoyama et al. |
| 2015/0001201 A1 | 1/2015 | Adler et al. |
| 2015/0258967 A1 | 9/2015 | Lepper et al. |
| 2015/0349706 A1 * | 12/2015 | Grossman ................. B08B 3/04 134/6 |
| 2016/0304065 A1 | 10/2016 | Hartman |
| 2017/0093330 A1 | 3/2017 | Castellucci et al. |

FOREIGN PATENT DOCUMENTS

| | | |
|---|---|---|
| CN | 104307784 | 1/2015 |
| CN | 108832882 | 11/2018 |
| DE | 3309895 | 9/1984 |
| DE | 87 05 413 | 8/1987 |
| DE | 3617395 | 11/1987 |
| DE | 102004036094 | 2/2006 |
| DE | 102008051397 | 4/2010 |
| DE | 102010006531 | 8/2011 |
| EP | 2048455 | 4/2009 |
| EP | 2549199 | 1/2013 |
| EP | 2551610 | 1/2013 |
| EP | 2696150 | 2/2014 |
| GB | 1 432 557 | 4/1976 |
| JP | 53-136363 | 1/1979 |
| JP | 05-262206 | 10/1993 |
| JP | 05262206 | 10/1993 |
| JP | 2004-186632 | 7/2004 |
| JP | 2011036833 | 2/2011 |
| JP | 2011-181711 | 9/2011 |
| JP | 2014-180593 | 9/2014 |
| JP | 2015-003310 | 1/2015 |
| KR | 10-2006-0132893 | 12/2006 |
| WO | WO 2005/075342 | 8/2005 |
| WO | WO 2007/000346 | 1/2007 |
| WO | WO 2007/015070 | 2/2007 |
| WO | WO 2008/005361 | 1/2008 |
| WO | WO 2009/013514 | 1/2009 |
| WO | WO 2010/034447 | 4/2010 |
| WO | WO 2011/004411 | 1/2011 |
| WO | WO 2011/133229 | 10/2011 |
| WO | WO 2012/123979 | 9/2012 |
| WO | WO 2014/001906 | 1/2014 |
| WO | WO 2014/022914 | 2/2014 |
| WO | WO 2014/080399 | 5/2014 |
| WO | 2014/143500 | 9/2014 |
| WO | WO 2014/163259 | 10/2014 |
| WO | WO 2016/197013 | 12/2016 |
| WO | WO 2017/044270 | 3/2017 |

OTHER PUBLICATIONS

PCT International Patent Application No. PCT/US20/12461; International Search Report and Written Opinion of the International Searching Authority dated Mar. 31, 2020, 11 pages.
Canadian Patent Application No. 2,807,317; Office Action dated Mar. 1, 2017, 5 pages total.
Canadian Patent Application No. 2,807,317; Office Action dated Aug. 29, 2018, 5 pages total.
Canadian Patent Application No. 2,807,317; Office Action dated Aug. 15, 2019, 6 pages total.
Chinese Patent Application No. 201680051869.6; Office Action dated Jun. 24, 2019, 9 pages total.
Korean Patent Application No. 10-2012-13257; Provisional Rejection dated May 30, 2017, 9 pages total.
European Patent Application No. 11772364.3; Office Action dated Sep. 29, 2017, 7 pages total.

(56) References Cited

OTHER PUBLICATIONS

European Patent Application No. 11772364.3; Office Action dated Aug. 14, 2018, 6 pages total.
European Patent Application No. 11772364.3; Office Action dated Jan. 22, 2019, 8 pages total.
European Patent Application No. 11772364.3; Office Action dated Aug. 19, 2019, 6 pages total.
European Patent Application No. 16844876.9; Extended European Search Report dated Mar. 28, 2019, 10 pages total.
Mexican Patent Application No. MX/a/2012/012194; Office Action dated Jan. 5, 2017, 3 pages total.
U.S. Appl. No. 13/642,427; Office Action dated Sep. 11, 2014.
U.S. Appl. No. 13/642,427; Office Action dated Jun. 10, 2015.
U.S. Appl. No. 13/642,427; Office Action dated Dec. 18, 2015.
U.S. Appl. No. 15/194,147; Office Action dated Jan. 11, 2019.
U.S. Appl. No. 14/846,906; Office Action dated Feb. 6, 2019.
U.S. Appl. No. 14/846,906; Office Action dated Sep. 17, 2019.
PCT International Patent Application No. PCT/US19/63754; International Search Report and Written Opinion of the International Searching Authority dated Feb. 4, 2020, 12 pages.
Corresponding Japanese Patent Application No. 2018-531295; Office Action dated Jul. 13, 2020 (with English translation); 18 pages total.
PCT International Patent Application No. PCT/US2011/000731; International Search Report and Written Opinion dated Jan. 18, 2012, 11 pages total.
auto123.com. Magic Vision Control from Mercedes-Benz. Website, http://www.auto123.com, originally downloaded May 25, 2012, 3 total pages.
Autovisuals. "Magic Vision Control" in the SL roadster. Website, http://autovisuals.com, originally downloaded May 25, 2012, 9 total pages.
Daimler. The new Mercedes-Benz SL: Lightweight, athletic, luxurious. Website, http://media.daimler.com, originally downloaded May 25, 2012, 1 page.
Just-Auto. Analysis: Mercedes' Magic Vision. Website, http://www.just-auto.com, originally downloaded May 25, 2012, 3 total pages.
Mercedes-Benz. Magic Vision Control adaptive windscreen washing system. Press Information dated Mar. 2012, 3 total pages.
Corresponding International Patent Cooperation Treaty Patent Application No. PCT/US2016/047419; International Search Report and the Written Opinion of the International Search Authority, dated Nov. 4, 2016, 11 pages total.
International Patent Cooperation Treaty Patent Application No. PCT/US2011/000731; International Search Report and the Written Opinion of the International Search Authority, dated Jan. 18, 2012, 11 pages total.
Corresponding Indian Patent Application No. 201837007256; Examination Report dated Sep. 29, 2020; 7 pages.

* cited by examiner

PANEL MAINTENANCE SYSTEM

This United States Patent Application is a continuation of U.S. patent application Ser. No. 14/846,906, filed Sep. 7, 2015, hereby incorporated by reference herein.

I. FIELD OF THE INVENTION

A panel maintenance system including a panel maintenance assembly configured to move over a plurality of panel modules to remove foreign matter from the panel face.

II. BACKGROUND OF THE INVENTION

With the increase in solar and thermal collector efficiency and energy prices, and the corresponding growth in the collector industry, there is a demand for auxiliary products to maintain or increase the efficiency of solar and thermal collectors. Several studies have shown that maintaining light transmissivity of solar and thermal collector panels is necessary in most parts of the world to maintain the maximum output efficiency of the collectors. The industry is quickly embracing more rigorous cleaning of the light transmissive panels of solar and thermal collectors.

The World Academy of Science conducted a research project on the effects of particulate on the performance of photovoltaic panels concluding that "[a]ccumulation of dust from the outdoor environment on the panels of solar photovoltaic (PV) system is natural. There were studies that showed that the accumulated dust can reduce the performance of solar panels, but the results were not clearly quantified. The objective of this research was to study the effects of dust accumulation on the performance of solar PV panels. Experiments were conducted using dust particles on solar panels with a constant-power light source, to determine the resulting electrical power generated and efficiency. It was found from the study that the accumulated dust on the surface of photovoltaic solar panel can reduce the system's efficiency by up to 50%."

An article from Scientific American regarding obstacles to utility-scale solar projects in the dessert said the following: "For photovoltaics (PV), water is only needed to clean the panels, which brings up the second large problem with desert solar: dust. Solar panels and mirrors need to be cleaned almost daily if efficiencies are to stay where they need to be. Dust is not transparent, so even just one gram of dust per square meter of solar panel area can reduce efficiency by around 40 percent. At that rate, it doesn't take long in a dusty desert for the problem to become intractable. In the desert near Abu Dhabi in the United Arab Emirates the Middle East's first large CSP plant recently faced down the dust issue. In order to reach the 100-megawatt-capacity goal of the Shams 1 plant, developers had to add substantially more mirrors to the plant than planned due to dust in the atmosphere . . . the plant probably ended up costing three times the initial estimate, thanks in part to dealing with that dust. And now that it is built, Shams 1 sends a series of trucks up and down the lines of 250,000 mirrors every day, using robot arms to spray that precious water and clean away the dust."

There would be an advantage in a panel module configured to include or including a panel maintenance assembly, that moved over the light transmissive panels to reduce the amount of foreign matter on the panel surface and correspondingly increase the efficiency of the panel module.

III. SUMMARY OF THE INVENTION

A broad object of particular embodiments of the invention can be to provide a frame having an frame inner side configured to capture a light transmissive panel of a collector and having an outer side including a track adapted to engage a panel maintenance assembly that moves over the light transmissive panel or array of panels to remove or reduce foreign matter on the light transmissive panel surface.

Another broad object of particular embodiments of the invention can be to provide a panel maintenance assembly which can be engaged to frame having frame outer side including a track to move over the light transmissive panel or array of panels to remove or reduce foreign matter on the light transmissive panel surface.

Another broad object of particular embodiments of the invention can be to provide a frame having an frame inner side configured to capture a light transmissive panel of a collector and having an outer side including a track engaging a panel maintenance assembly including at least one blade or sweeper that contacts the light transmissive panel or array of panels to remove or reduce foreign matter on the light transmissive panel surface as the a panel maintenance assembly moves along the track.

Another broad object of particular embodiments of the invention can be to provide a frame having an frame inner side configured to capture a light transmissive panel of a collector and having an outer side including a track engaging a panel maintenance assembly including at least one blade or sweeper that contacts the light transmissive panel or array of panels to remove or reduce foreign matter on the light transmissive panel surface as the a panel maintenance assembly moves along the track.

Another broad object of particular embodiments of the invention can be to provide a frame having an frame inner side configured to capture a light transmissive panel of a collector and having an outer side including a track engaging a panel maintenance assembly including at least two blades or sweepers or combination thereof that contact the light transmissive panel or array of panels to provide a blade bounded channel in which an amount of fluid can pass to remove or reduce foreign matter on the light transmissive panel surface as the a panel maintenance assembly moves along the track.

Another broad object of particular embodiments of the invention can be to provide a frame having an frame inner side configured to capture a light transmissive panel of a collector and having an outer side including a track engaging a panel maintenance assembly including a fluid reservoir adapted to contain an amount of fluid and fluid pump operable to deliver an amount of fluid to the light transmissive panel surface as the a panel maintenance assembly moves along the track.

Another broad object of particular embodiments of the invention can be to provide a frame having an frame inner side configured to capture a light transmissive panel of a collector and having an outer side including a track engaging a panel maintenance assembly including a processor in communication with a memory element containing a panel maintenance program executable convert a sensed amount of light transmissivity or amount of light reflectivity of the light transmissive panel to a light transmissivity value or a light reflectivity value which can be compared to one or more pre-selected light transmissivity threshold values or light reflectivity threshold values to determine the amount of fluid to deliver to the light transmissive panel and extent of movement of the panel maintenance assembly over the light transmissive panel.

Another broad object of particular embodiments of the invention can be to provide a panel maintenance assembly which moves over the light transmissive panel to dock with a docking station to couple matable portions of a fluid supply connector or a power supply connector to supply an amount of fluid to a fluid reservoir or recharge a rechargeable power source born by the a panel maintenance assembly.

Naturally, further objects of the invention are disclosed throughout other areas of the specification, drawings, photographs, and claims.

IV. BRIEF DESCRIPTION OF THE DRAWINGS

V. DETAILED DESCRIPTION OF THE INVENTION

Figure 1:
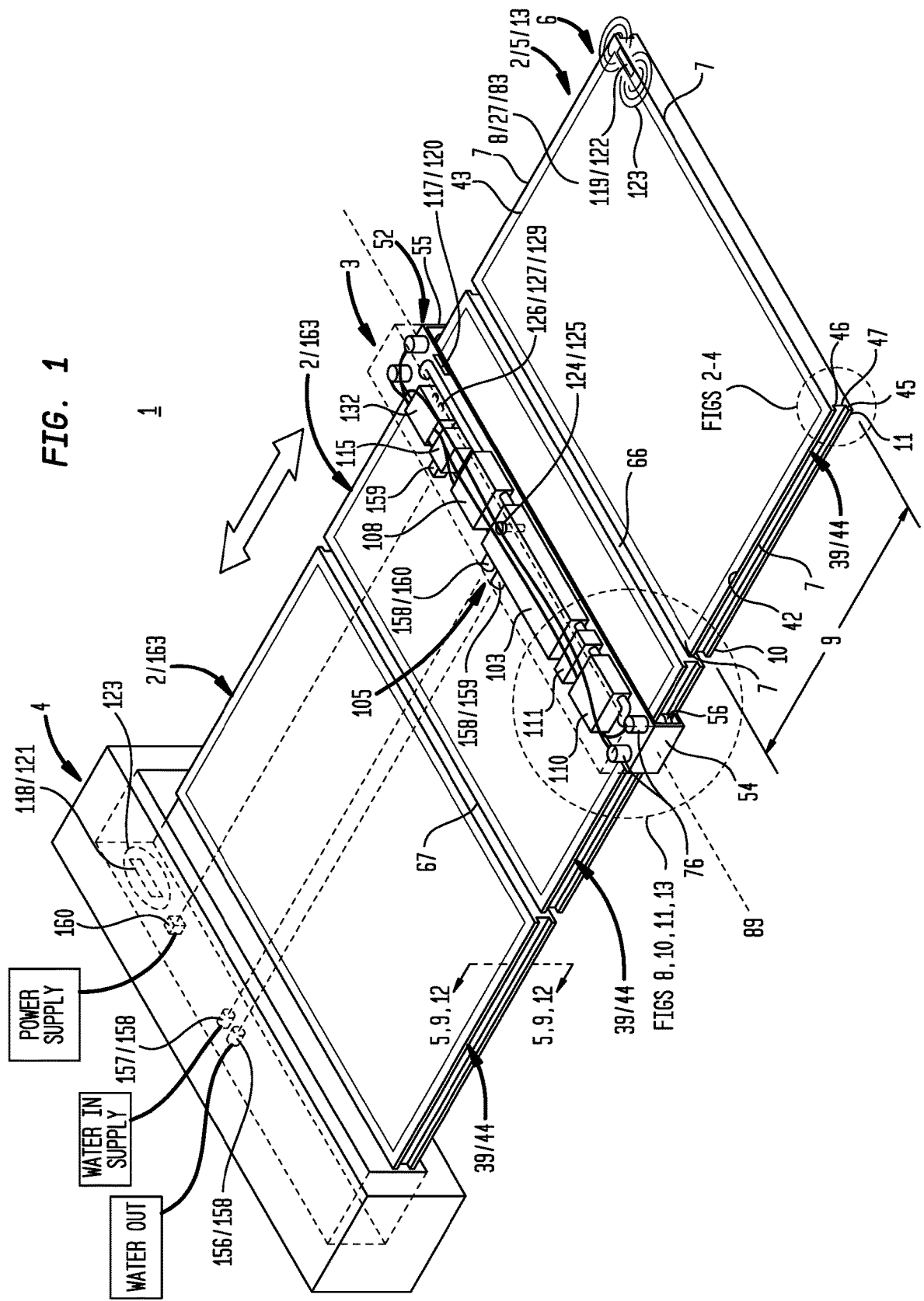
FIG. 1 is a perspective view of an embodiment of a panel maintenance system.

Generally, a panel maintenance system including a panel maintenance (1) assembly configured to move over a plurality of panel modules (2). Specifically, a panel module (2) can but need not necessarily, include a first frame (6) including a first plurality of frame members (7) joined to enclose a first panel (8). The first plurality of frame members (7) including a first frame inner side (14) configured to capture the first panel (8) within the first frame (6) and a first frame outer side (15) configured to provide a first track (39) axially extending between frame member first and second ends (10)(11) of at least one of the first plurality of frame members (7). The first track (39) configured to engage a drive element (75) of a carriage (52) which operates to move the carriage (52) over the first panel (8). The carriage (52) can, but need not necessarily, bear one or more components which function to maintain the first panel (8).

Now referring primarily to FIG. 1 which provides a general overview of a panel maintenance system (1) including one or more of: a panel module (2), a panel maintenance assembly (3) configured to move over the panel module (2), and a docking station (4) which interfaces with the panel maintenance assembly (3). A first panel module (5) can include a first frame (6) including a first plurality of frame members (7) joined to capture a first panel (8). As to particular embodiments, each of the first plurality of frame members (7) can have a frame member length (9) disposed between frame member first and second ends (10)(11).

Now referring primarily to FIGS. 1 through 4, the frame member first and second ends (10)(11) can be configured to be directly joined or indirectly joined by mechanical fasteners (12) or made as one-piece, to provide a rectangular frame (13). However, the example of a first plurality of frame members (7) joined to form a rectangular frame (13) is not intended to preclude a first plurality of frame members (7) formed or fabricated as one-piece or joined to form a first frame (6) having any one of a wide variety of configurations, including as examples: square, rectangle, triangle, circle, oval, elliptical or otherwise configured for capturing a first panel (8).

Figure 2:
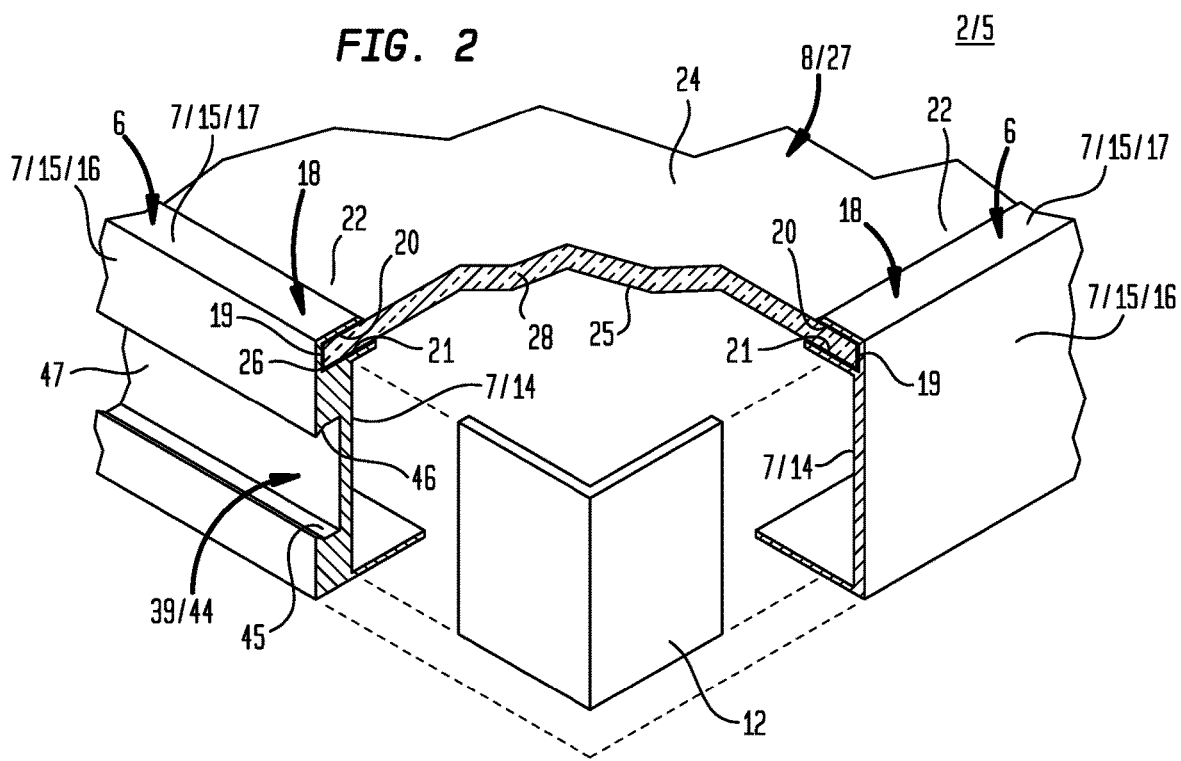
FIG. 2 is an enlarged perspective cutaway view of a corner of a panel module.
Figure 3:
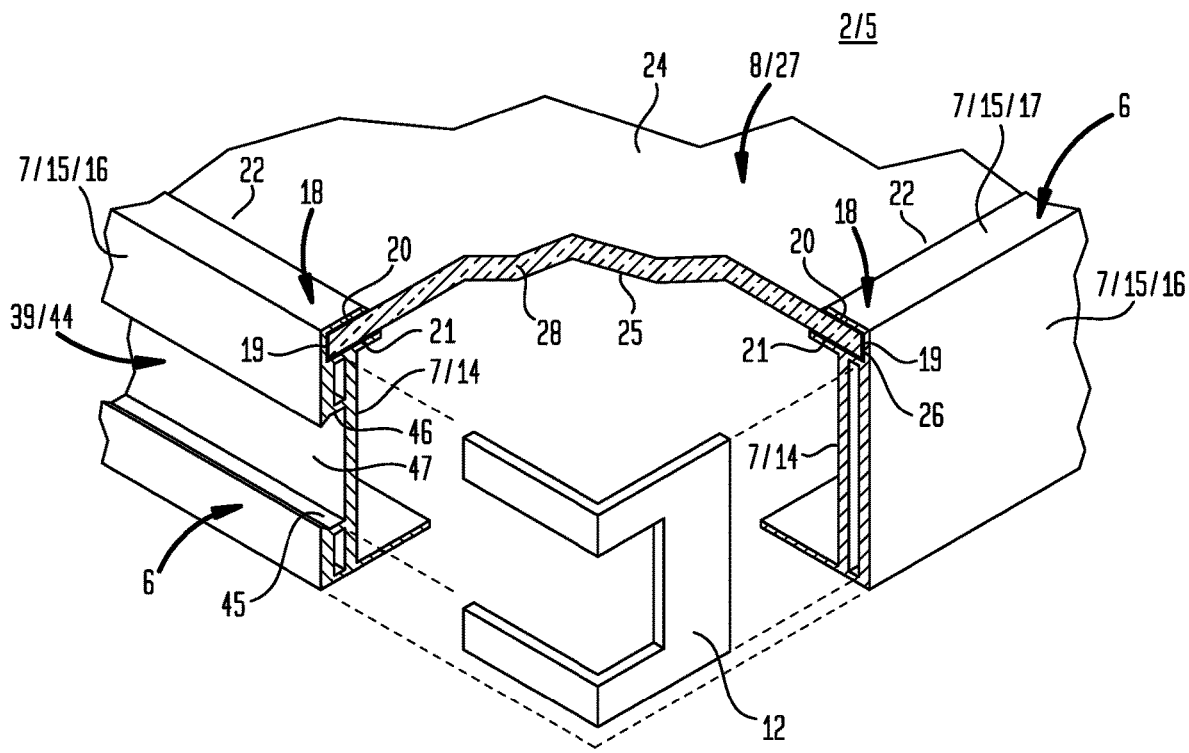
FIG. 3 is an enlarged perspective cutaway view of a corner of a panel module.
Figure 4:
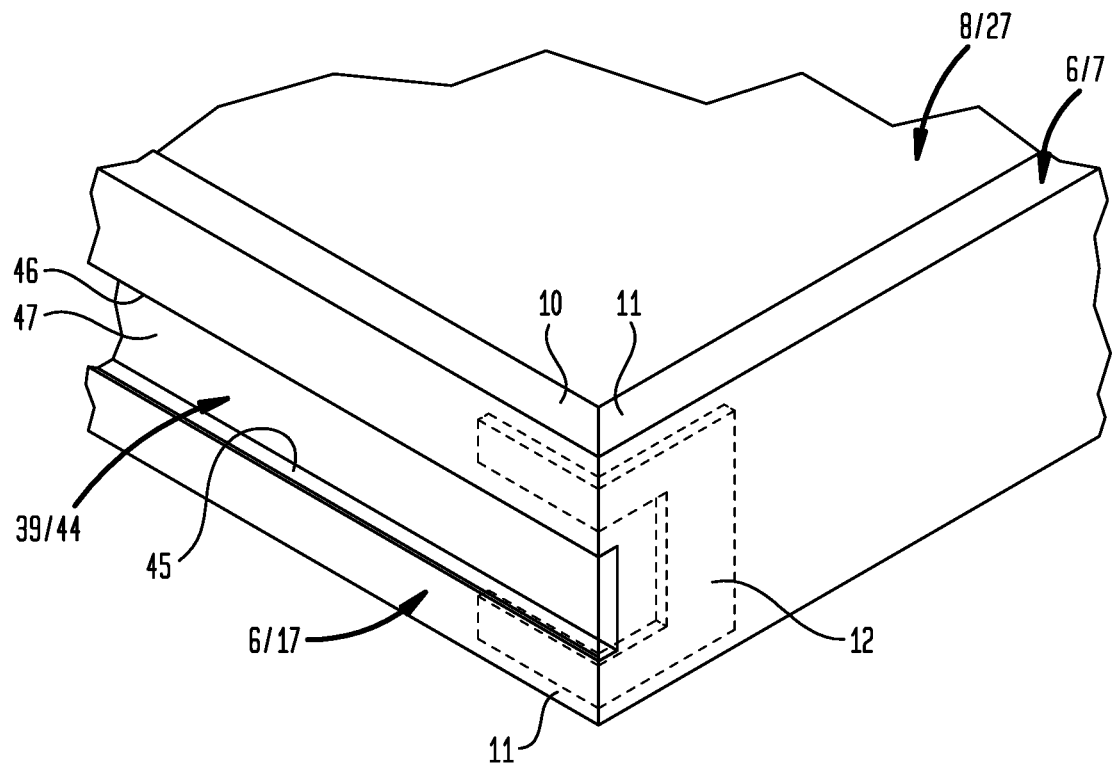
FIG. 4 is an enlarged perspective view of a corner of panel module.
Figure 5:
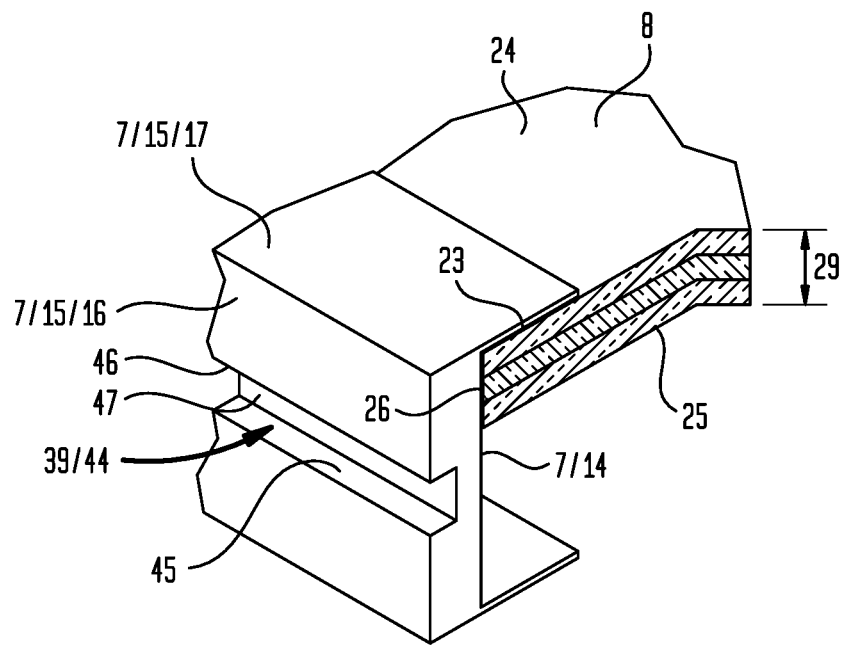
FIG. 5 is a cross sectional view 5-5 of FIG. 1 showing a panel having a plurality of layers.

Again referring primarily to FIGS. 2 through 5, the first plurality of frame members (7) can have a first frame inner side (14) opposite a first frame outer side (15). The first frame inner side (14) can be configured to capture the first panel (8) within the first frame (6). As shown in the examples of FIGS. 2 and 3, an embodiment of the first frame inner side (14) can be configured to provide a panel channel (18) having a panel channel base (19) which disposes in opposed relation a distance apart a pair of panel channel sides (20)(21) which fixedly or releasably receive the panel margins (22) of a first panel (8). As shown in FIG. 5, a second illustrative example includes a first frame inner side (14) configured as a flange (23) to which the first panel (8) directly or indirectly couples whether by mechanical fasteners, adhesive, or the like. However, these illustrative examples are not intended to preclude the first frame inner side (14) from being configured in any manner which allows the first panel (8) to be captured in fixed relation to the first frame (6).

Again referring primarily to FIGS. 2 through 5, a first panel (8) can include a panel first side (24) and a panel second side (25) joined in opposed relation a thickness apart by a peripheral edge (26). Embodiments of the first panel (8) can, but need not necessarily, include flat or substantially flat panel first and second sides (24)(25) joined in parallel opposed relation a thickness apart by a peripheral edge (26)(as shown in the examples of FIGS. 2, 3 and 5). The peripheral edge (26) can bound a first panel (8) configured to have the panel margins (22) captured by a first frame (6). However, the example of a first panel (8) having flat panel first and second sides (24)(25) does not preclude embodiments in which neither or only one of the panel first or second sides (24)(25) is flat and one or both of the panel first or second sides (24)(25) can be arcuate in one or more directions. The first panel (8) can, but need not necessarily, be made of or contain a light transmissive material (27), such as glass or plastic.

Now referring primarily to FIGS. 2 through 7, a first panel (8) can include only one panel layer (28)(as shown in the example of FIGS. 2 through 4) or can include a plurality of panel layers (29) between the panel first side (24) and the panel second side (25)(as shown in the example of FIG. 5). The plurality of panel layers (29) can, but need not necessarily, be made of the same material or perform the same function.

Figure 6:
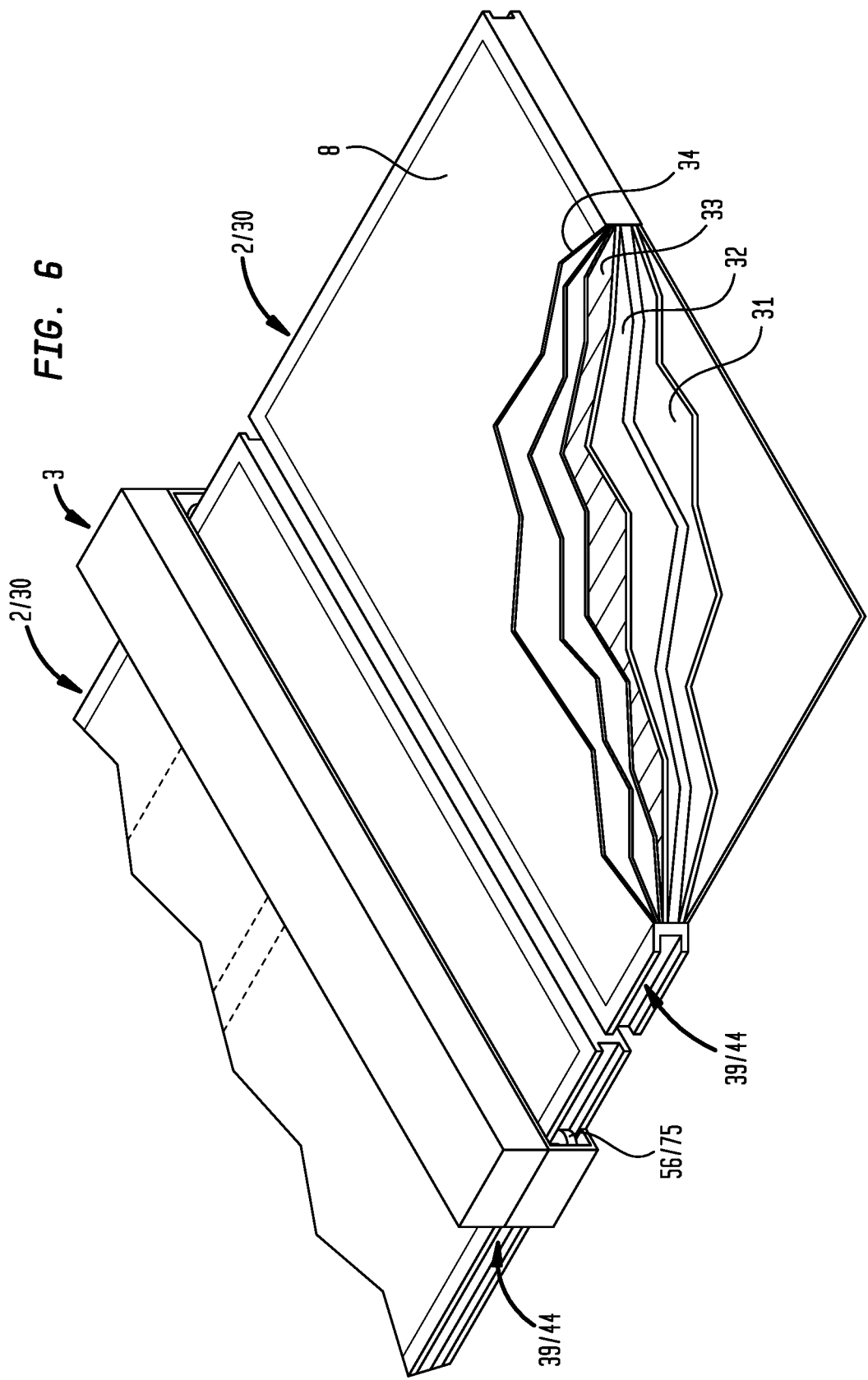
FIG. 6 is a perspective view of an embodiment of a panel maintenance system for a solar photovoltaics panel including a cutaway showing the elements of an illustrative solar photovoltaics panel.
Figure 7:
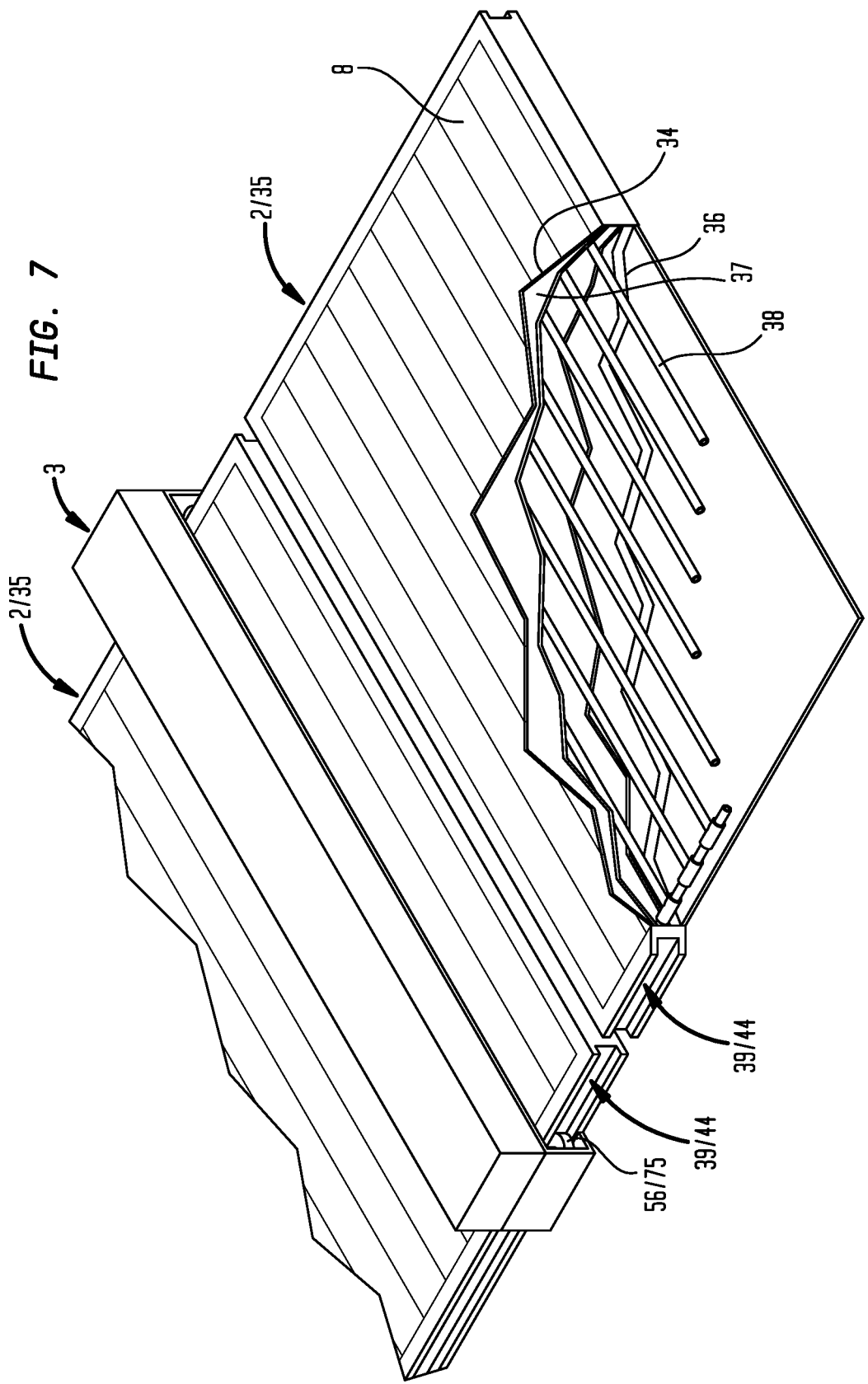
FIG. 7 is a perspective view of an embodiment of a panel maintenance system for a solar thermal collector panel including a cutaway showing the elements of an illustrative solar thermal collector panel.

Now referring primarily to FIGS. 6 and 7, as to particular embodiments, the first panel module (2) can, but need not necessarily, be a solar photovoltaics panel (30) (as shown in the example of FIG. 6) which can include: a p-type silicone layer (31), a depletion layer (32), an n-type silicon layer (33), and a light transmissive layer (34). As to particular embodiments, the first panel module (2), can but need not necessarily, be a solar thermal collector panel (35) which can include: an insulation layer (36), an absorber layer (37), flow tubes (38), and a light transmissive layer (34).

Now referring primarily to FIGS. 8 through 11, the first frame outer side (15) can be configured to include a first track (39) extending between frame member first and second ends (10)(11) of at least one of the first plurality of frame members (7). As to particular embodiments, the first track (39) can include a pair of tracks (40)(41) extending between corresponding frame member first and second ends (10)(11) of a pair of the plurality of frame members (42)(43) disposed in opposed relation in the first frame (6)(as shown in the example of FIG. 1). Typically, the first track (39) or the pair of tracks (40)(41) continuously axially extend along the entire distance between the frame member first and second ends (10)(11)(as shown in the example of FIG. 1); however, these illustrative examples are not intended to preclude embodiments in which the first track (39) or pair of tracks (40)(41) extend between frame member first and second ends (10)(11) but terminate a distance from one or both of the frame member first or second ends (10)(11) or are not continuous, but rather discontinuous or periodically interrupted or made of a plurality of spaced apart first track segments along the frame member length (9). Moreover, while the embodiments illustrated show the first track (39) or pair of tracks (40)(41) disposed on or in the first frame outer side edge (16), this is not intended to preclude embodiments having the first track (39) or a pair of tracks (40)(41) disposed on or in the first frame outer side face (17).

Figure 8:
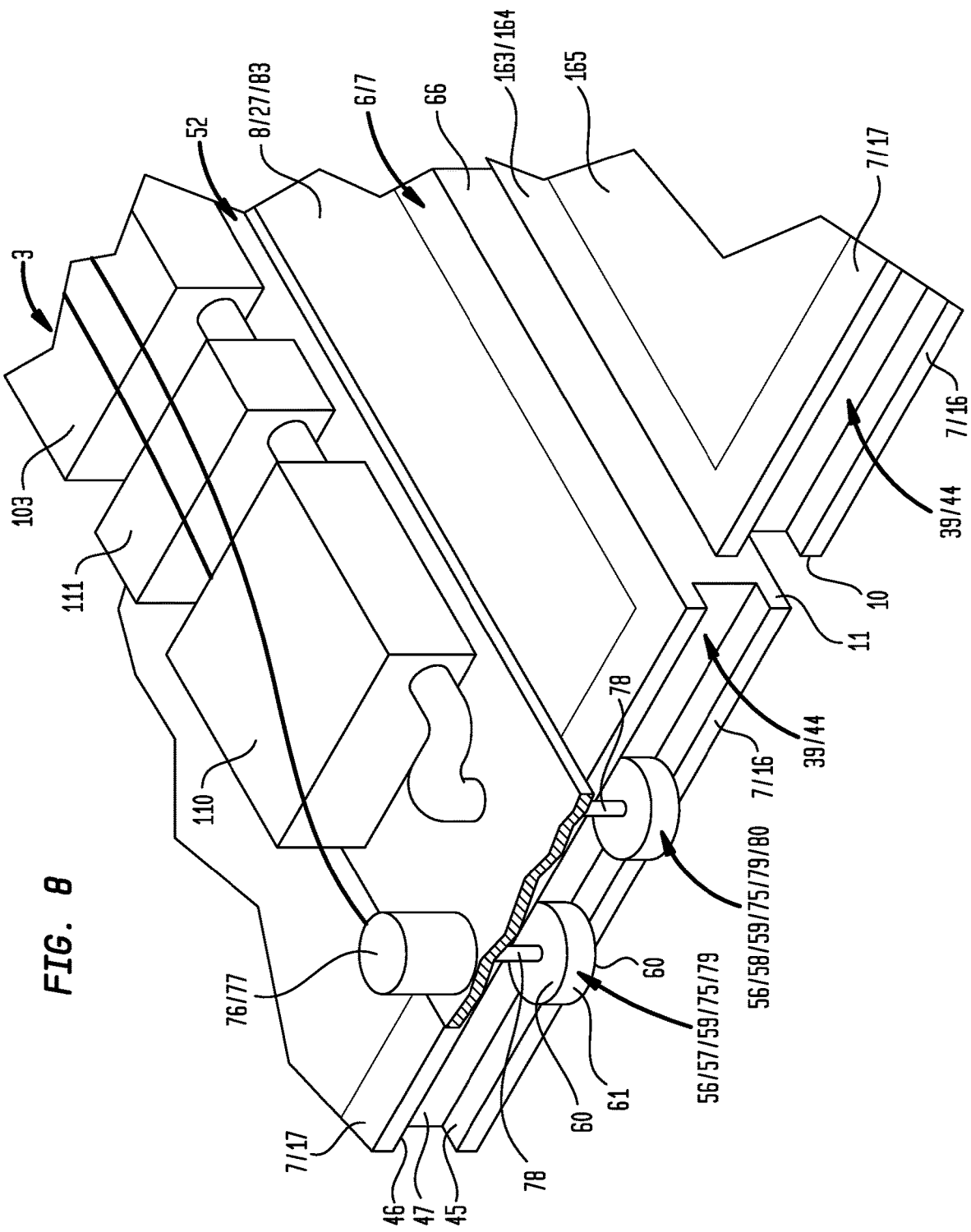
FIG. 8 is a perspective view of an embodiment of a frame outer side configured to include a track which matably engages the drive elements of a panel maintenance assembly.
Figure 9:
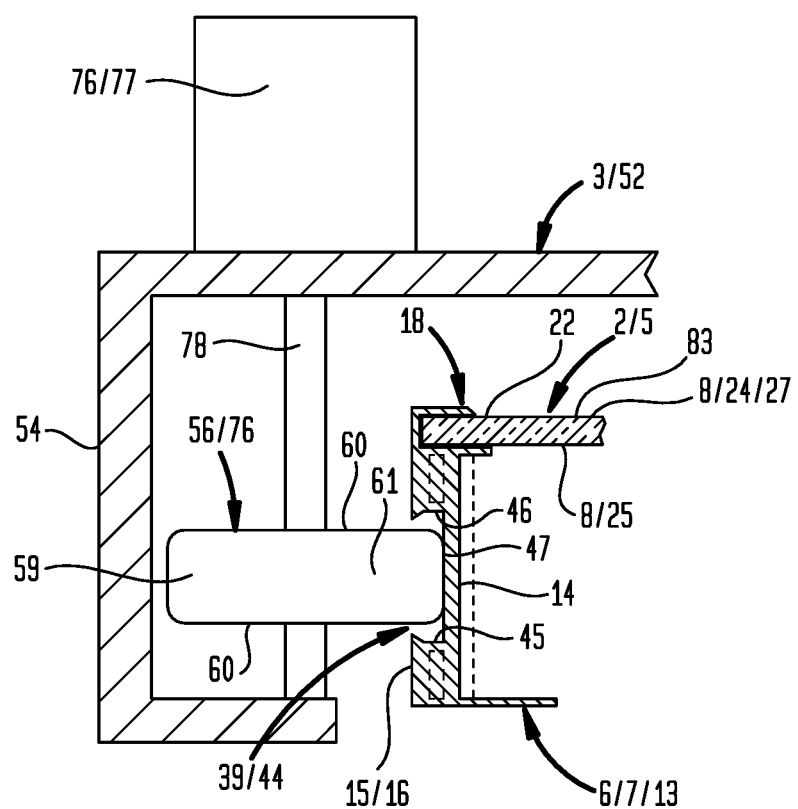
FIG. 9 is a cross sectional view 9-9 of an embodiment of a frame outer side configured to include a track which matably engages the drive elements of a panel maintenance assembly.
Figure 10:
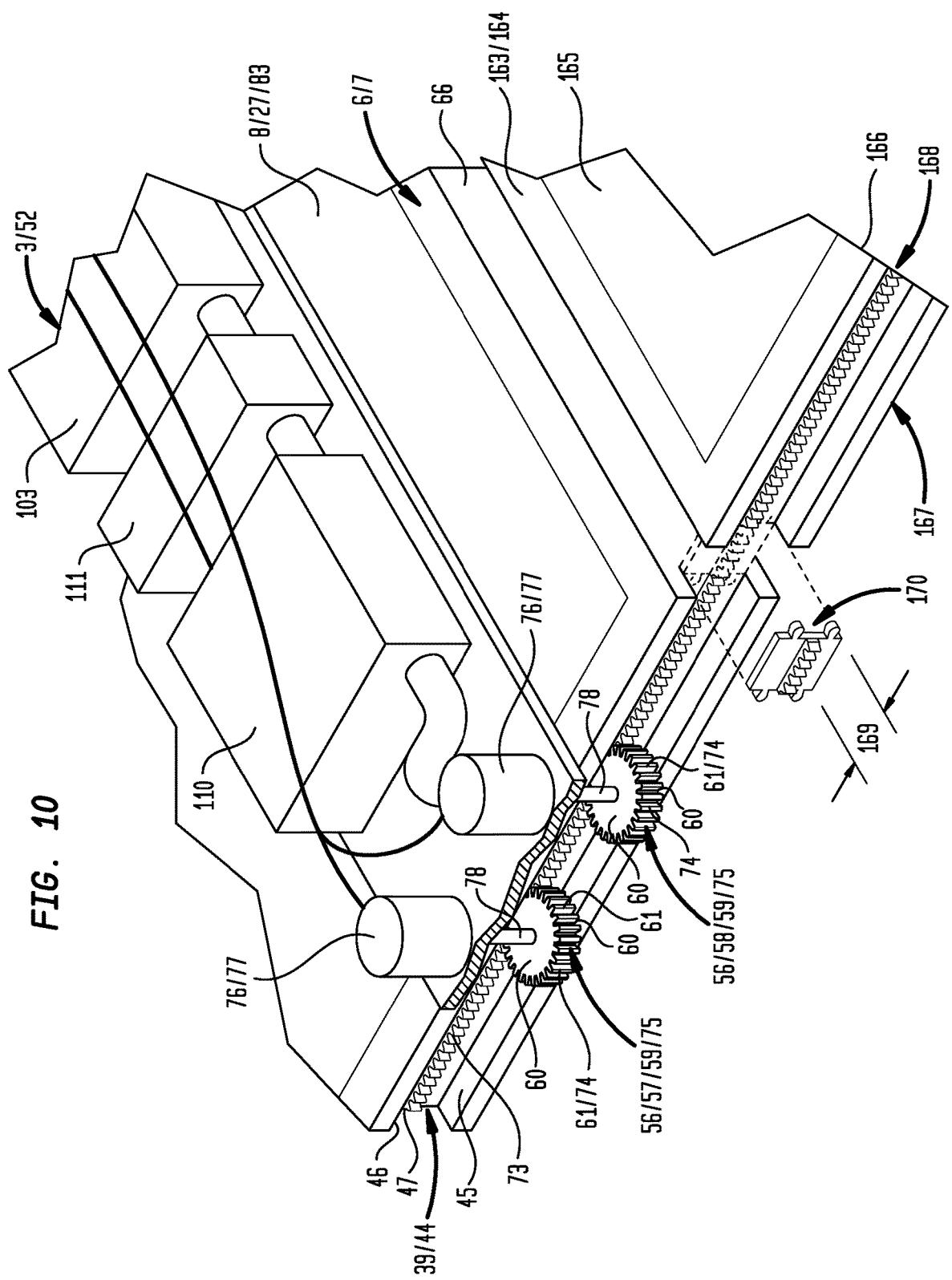
FIG. 10 is a perspective view of an embodiment of a frame outer side configured to include a track which matably engages the drive elements of a panel maintenance assembly.

Now referring primarily to FIGS. 8 through 10, as to particular embodiments, the first track (39) can, but need not necessarily include, a channel element (44) disposed in the first frame outer side (15). The channel element (44) can have a pair of channel side walls (45)(46) joined in spaced apart relation by a channel base (19).

Figure 11:
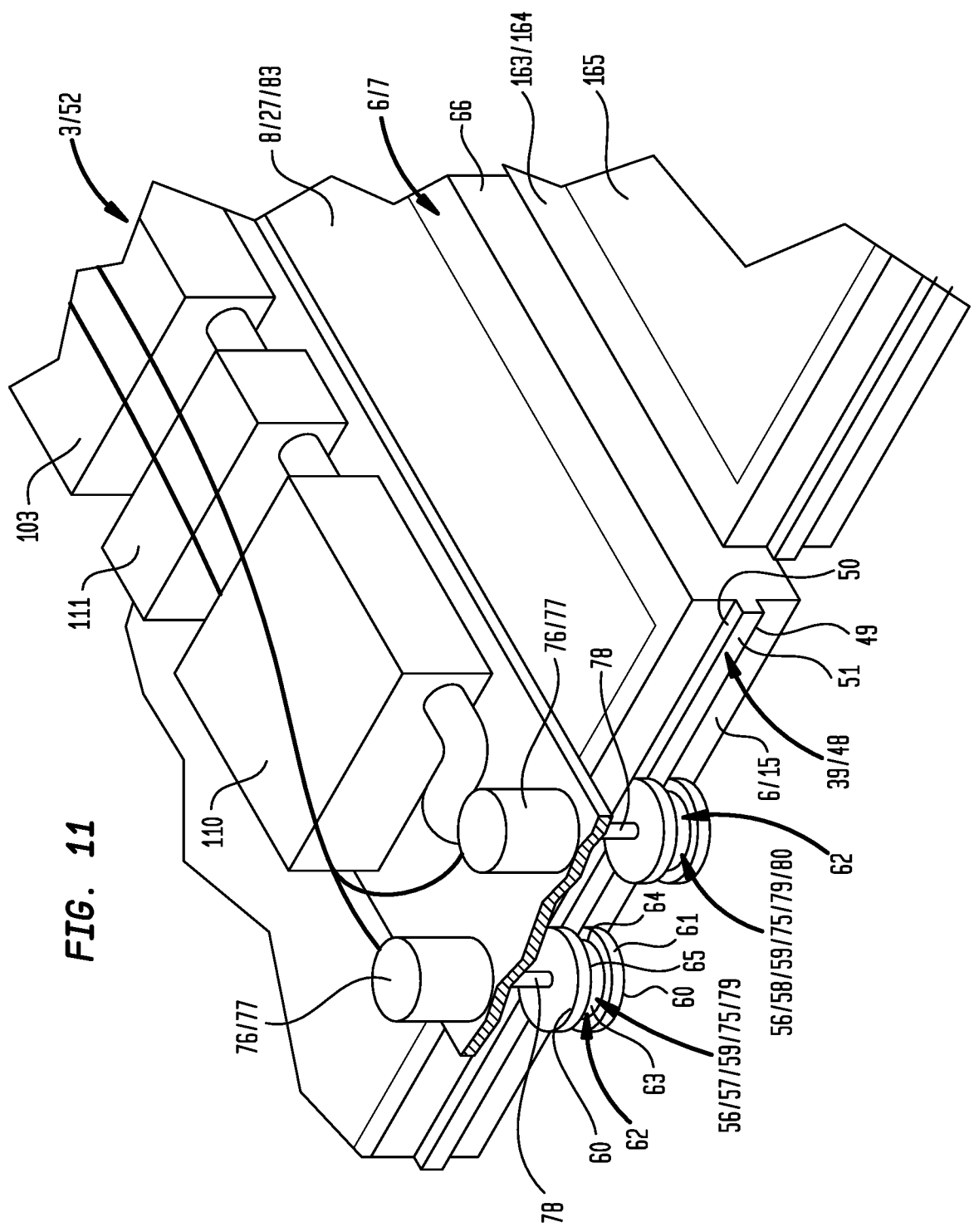
FIG. 11 is a perspective view of an embodiment of a frame outer side configured to include a track which matably engages the drive elements of a panel maintenance assembly.
Figure 12:
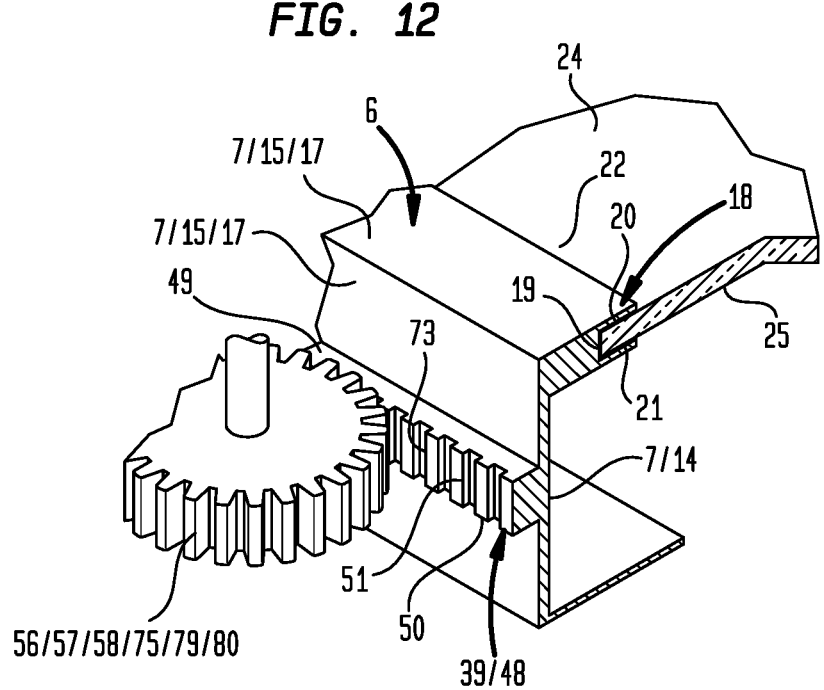
FIG. 12 is a cross sectional view 12-12 of an embodiment of the outer frame side configured to include a track which matably engages the drive elements of a panel maintenance assembly.

As shown in FIGS. 11 and 12, particular embodiments of the first track (39) can, but need not necessarily, include a rail (48) coupled to the first frame outer side (15). The rail (48) can have a pair of rail sidewalls (49)(50) projecting from the first frame outer side (15) joined in spaced apart relation by a rail top (51).

Now referring to FIGS. 8 through 27, the panel maintenance system (1) can, but need not necessarily, further include a panel maintenance assembly (3) configured to move over the first panel module (5) or a plurality of panel modules (2) as shown in the example of FIG. 1. Embodiments of the panel maintenance assembly (3) can include a carriage (52) having a carriage length (53) disposed between carriage first and second ends (54)(55) at least one of which can, but need not necessarily, include a tracking element (56) configured to movably engage, or be moveably engaged, with the first track (39) to directional guide the carriage (52) over one or more panel modules (2). As to particular embodiments, each of the carriage first and second ends (54)(55) can corresponding include a tracking element (56) configured to movably engage, or be movably engaged, with a pair of first tracks (40)(41) extending between corresponding frame member first and second ends (10)(11) of a pair of the plurality of frame members (42)(43) disposed in opposed relation in the first frame (6)(as shown in the examples of FIGS. 1, 20 and 21). As to particular embodiments, each of the carriage first and second ends (54)(55) can include a pair of tracking elements (57)(58) each pair configured to movably engage or be movably engaged with a corresponding pair of tracks (40)(41) extending between corresponding frame member first and second ends (10)(11) of a pair of the plurality of frame members (42)(43) disposed in opposed relation in the first frame (6).

Now referring primarily to the illustrative example of FIGS. 8 through 10, the tracking element (56) can be a rotatable member (59) having a pair of member sides (60) joined by a circumferential face (61). The rotatable member (59) can be configured to be received in the channel element (44) to engage the circumferential face (61) or one of pair of member sides (60) with one or more of the pair of channel side walls (45)(46) or the channel element base (47). Now referring to the illustrative example of FIGS. 11 and 12, the rotatable member (59) can further include an annular groove (62) disposed in the circumferential face (61). The annular groove (62) can be configured to receive the rail (48) to engage a circumferential groove face (63) or one of a pair of groove side walls (64)(65) with one or more of the pair of rail sidewalls (49)(50) or the rail top (51). However, these illustrative examples are not intended to preclude other configurations of the tracking element (56) which can be configured to engage the first frame outer side (15) to guide the carriage (52) over the first panel (8) captured by the first frame (6) along a path between an opposed second pair of frame members (66)(67) of a first frame (6).

Figure 13:
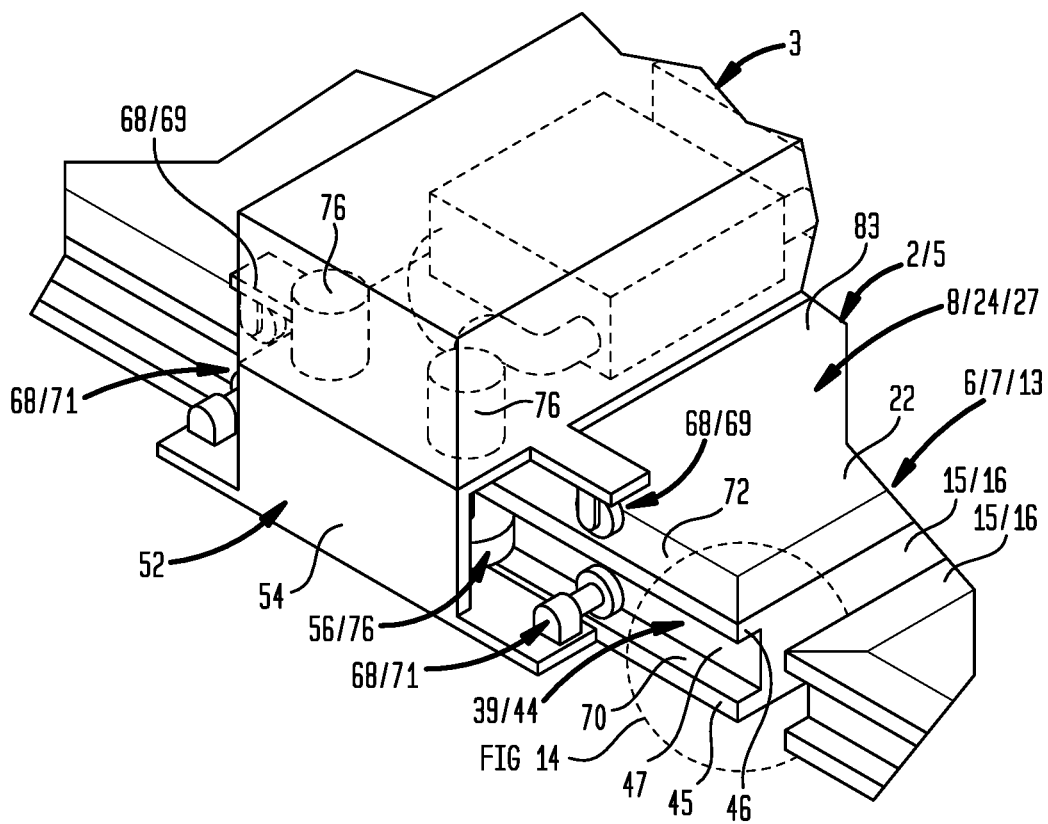
FIG. 13 is a perspective view of an embodiment of a frame outer side configured to include a track which matably engages the drive elements of a panel maintenance assembly.

Now referring primarily to FIG. 13, the tracking element (56) can further include a plurality of guide members (68) coupled to the carriage (52) proximate one or both of the carriage first and second ends (54)(55). The plurality of guide members (68) can concurrently discretely engage the first frame outer side (15) or the first track (39), or a combination of the first frame outer side (15) and the first track (39) to assist in disposing the carriage (52) in movable fixed relation to the first frame (6). The plurality of guide members (68) includes a first pair of guide members (69) disposed a distance apart each of which engages a channel inner surface (70) of one of the pair of channel side walls (45)(46) of the channel element (44) disposed in the first frame outer side (15) and a second pair of guide members (71) disposed a distance apart each which engages a channel outer surface (72) of one of the pair of channel sidewalls (45)(46) of the channel (39). One or a pair of tracking elements (57)(58) can be coupled to each of the carriage first and second ends (54)(55) between corresponding first and second pairs of guide members (69)(71) to concurrently engage the each of a pair of tracks (40)(41) correspondingly coupled to a first pair of the plurality of frame members (42)(43) disposed in opposed relation in the first frame (6).

Now referring primarily to FIGS. 10 and 12, the first track (39) or the first pair of tracks (40)(41) can, but need not necessarily, include a first plurality of teeth (73) projecting in spaced apart relation from the first track (39) or pair of tracks (40)(41). A second plurality of teeth (74) can project in spaced apart relation from the corresponding tracking element (56) or a pair or pairs of tracking elements (57)(58). The first plurality of teeth (73) can matably engage the second plurality of teeth (74). As shown in the example of FIG. 10, the first plurality of teeth (73) can project in spaced apart relation from the channel element base (47) and the second plurality of teeth (74) can project in circumferentially spaced apart relation from the circumferential face (61) of the rotatable member (59). The first plurality of teeth (73) of the first track (39) can matably engage the second plurality of teeth (74) projecting from the circumferential face (61) of the rotatable member (59). As shown in the illustrative example of FIG. 12, the first plurality of teeth (73) can project in spaced apart relation from the rail top (51) and the second plurality of teeth (74) can project in circumferentially spaced apart relation from a circumferential face (61) or a circumferential groove face (63). The first plurality of teeth (73) projecting from the rail top (51) can matably engage the second plurality of teeth (74) projecting from the circumferential groove face (63).

Again referring primarily to FIGS. 8 through 13, the carriage (52) can, but need not necessarily, further include a drive element (75) configured to engage or be engaged, with the first frame outer side (15). Operation of the drive element (75) results in movement of the carriage (52) over the first panel (8) captured by the first frame (6) along a path between an opposed second pair of frame members (66)(67) of a first frame (6). As to particular embodiments, the drive element (75) can be discrete from the tracking element (56) or the plurality of guide members (68) and operably engage the first frame outer side (15) to move the carriage (52) over the first panel (8) captured in the first frame (6). As to particular embodiments, the drive element (75) can comprise a rotatable member (59) having a pair of member sidewalls (60) joined by a circumferential face (61). Any one or more of the pair of rotatable member sidewalls (60) or the circumferential face (61) can be engaged with the first frame outer side (15) and upon rotation of the rotatable member (59) the carriage (52) can move over the first panel (8) captured in the first frame (6).

Again referring primarily to FIGS. 8 through 13, particular embodiments of the carriage (52) can, but need not necessarily, include a driver (76) which operates to generate motion in the drive element (75) engaged to the first frame outer surface (17) to correspondingly move the carriage over the first panel (8) captured in the first frame (6). As to other embodiments, the carriage (52) can lack a discrete drive element (75) and the driver (76) can operate to generate motion in one or more of the tracking elements (56) to correspondingly move the carriage over the first panel (8) captured in the first frame (6). As to particular embodiments, the driver (76) can comprise an electric motor (77) having a shaft (78) which rotates to directly or indirectly cause rotation of one or more of the tracking elements (56) engaged with the first track (39). As to the particular embodiment shown in FIG. 8, the driver (76) comprises an electric motor (77) having a motor shaft (78) coaxially joined to one of a pair of tracking elements (57)(58) to provide a driven tracking element (79) and an idler tracking element (80) engaged with the first track (39). The driven tracking element (79) operable to transmit rotational force to the first track (39) sufficient to move the carriage (52) over the first panel (8) captured in the first frame (6) while the idler tracking element (80) operates to guide the carriage (52) over the first panel (8) captured in the first frame (6). An illustrative example of a driver (76) suitable for use with embodiments of the invention can be a direct current motor made by Mabuchi, Part No. EM-400.

Figure 14:
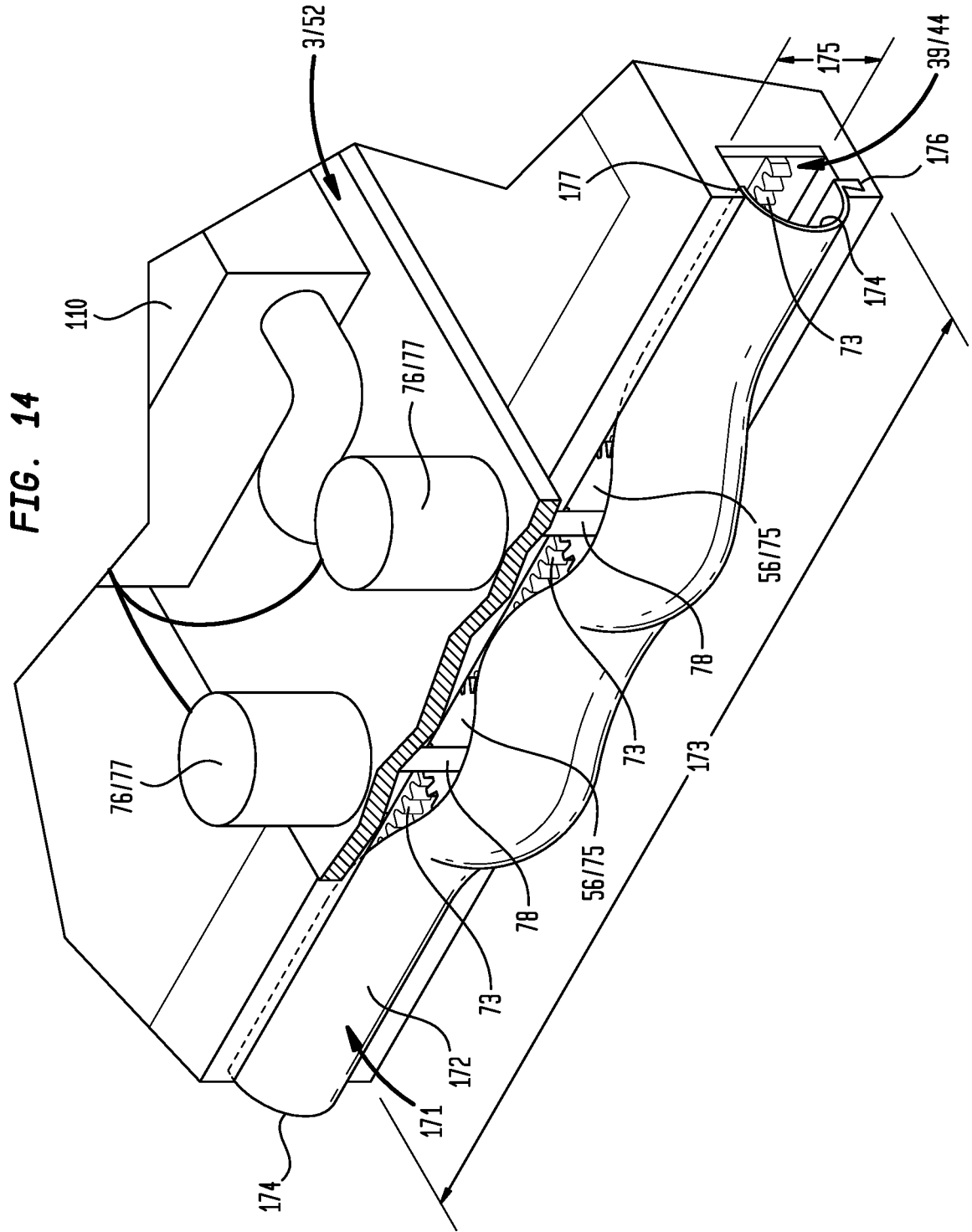
FIG. 14 is a perspective view of an embodiment of a frame outer side configured to include a track which matably engages the drive elements of a panel maintenance assembly further including an embodiment of a flexible track cover.
Figure 15:
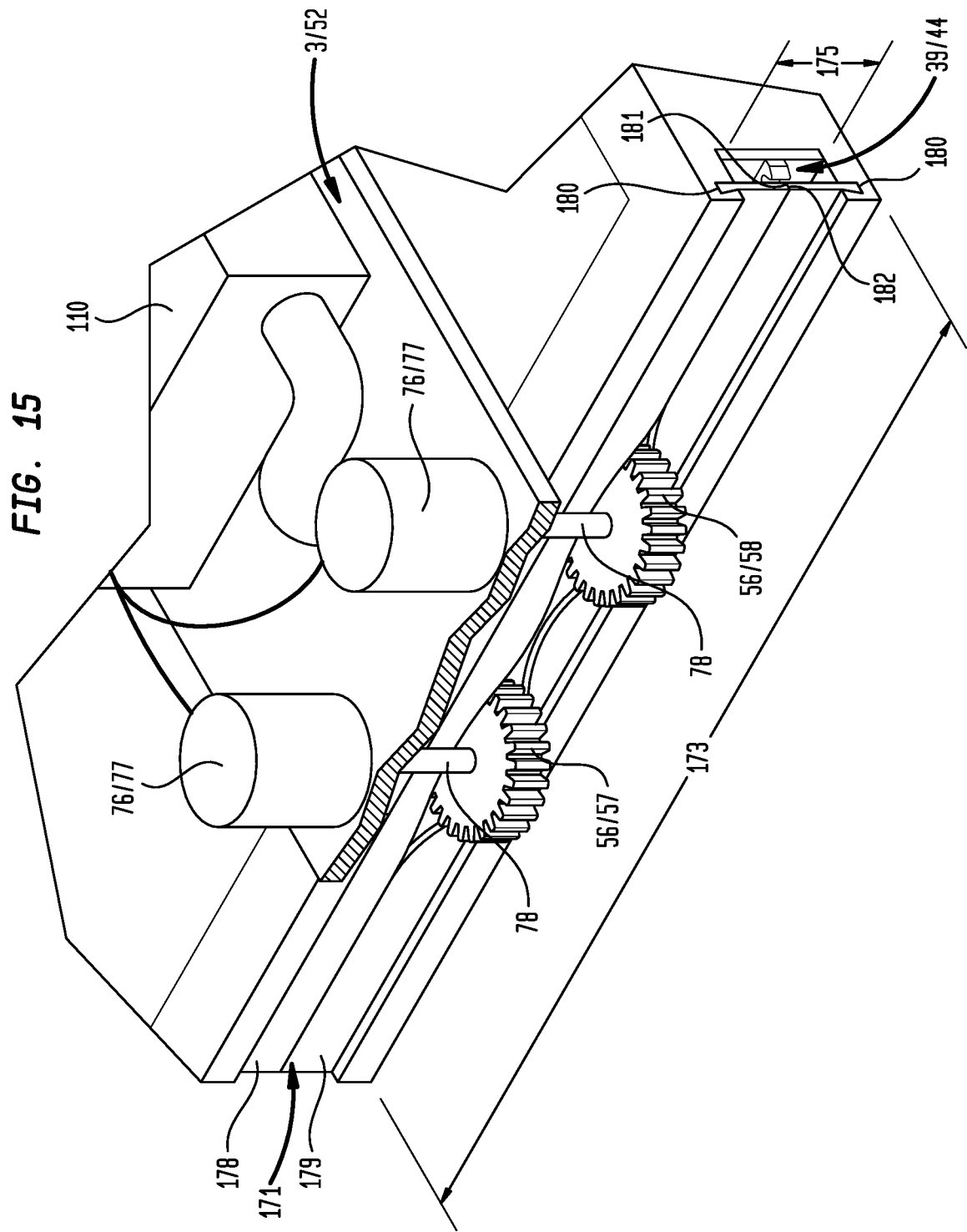
FIG. 15 is a perspective view of an embodiment of a frame outer side configured to include a track which matably engages the drive elements of a panel maintenance assembly further including an embodiment of a flexible track cover.

Now referring primarily to FIGS. 14 and 15, a track cover (171) can be configured to in part or in whole cover the first track (39) to prevent or reduce exposure of the track (39) and the tracking element (56) or drive element (75) engaged to the first track (39) to foreign matter. As to the particular embodiment shown in the example of FIG. 14, the track cover (171) can include a resiliently flexible member (172) having a cover length (173) disposed between cover ends (174) and a cover width (175) disposed between opposite first and second cover sides (176)(177). The first cover side (176) can be connected to the first frame (6) along one side of first track (39) allowing the resiliently flexible member (172) to extend over the first track (39) to position the second cover side (177) against the first frame (6) along the other side of the first track (39). The tracking element (56) or the drive element (75) engaged with the first track (39) can correspondingly engage a portion of the track cover (171) causing that portion of the track cover to resiliently flex moving the second cover side (177) away from the first frame (6). The second cover side (177) can return toward the first frame (6) as the tracking element (56) or drive element (75) disengages from that portion of the track cover (171).

As to the particular embodiment shown in FIG. 15, the track cover (171) can include a pair of resiliently flexible cover members (178)(179) each having a cover first side (180) connected to the first frame (6) on opposite sides of the first track (39). Each of the pair of resiliently flexible cover members (178)(179) can extend outward to terminate in abutted or overlapping cover second sides (181)(182) to cover the first track (39). The tracking element (56) or drive element (75) can be disposed between a portion of the abutted or overlapped cover second sides (181)(182) to resiliently flexibly deform the pair of resiliently flexible cover members (178)(179) at that portion of the track cover (171). The cover second sides (181)(182) can return toward the overlapped or abutted configuration upon disengagement of the tracking element (56) or drive element (75).

Figure 17:
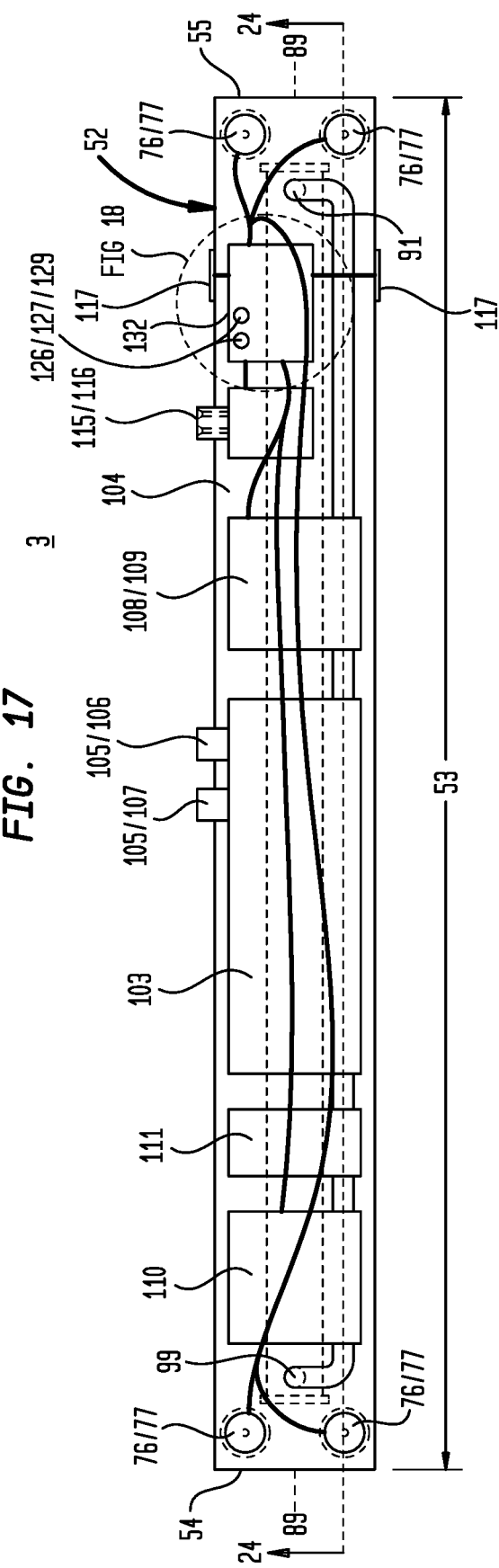
FIG. 17 is a top plan view of an embodiment of a panel maintenance assembly.
Figure 18:
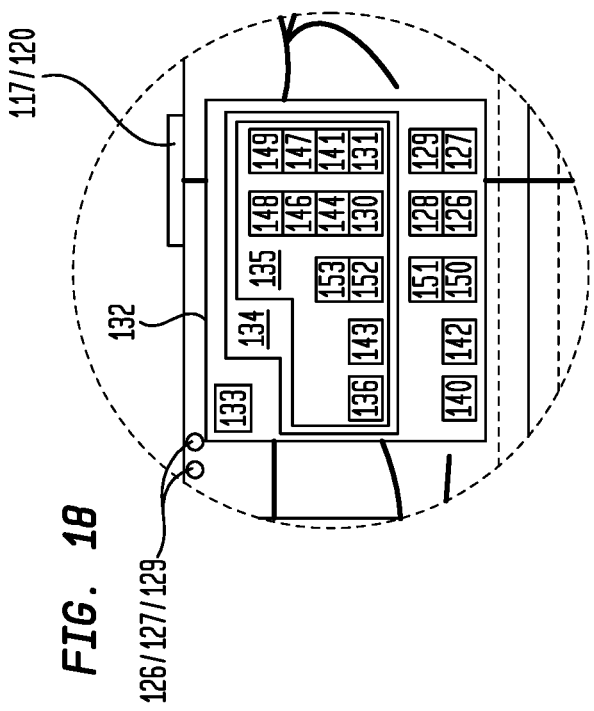
FIG. 18 is an enlarged portion of the top plan view shown in FIG. 17.
Figure 19:
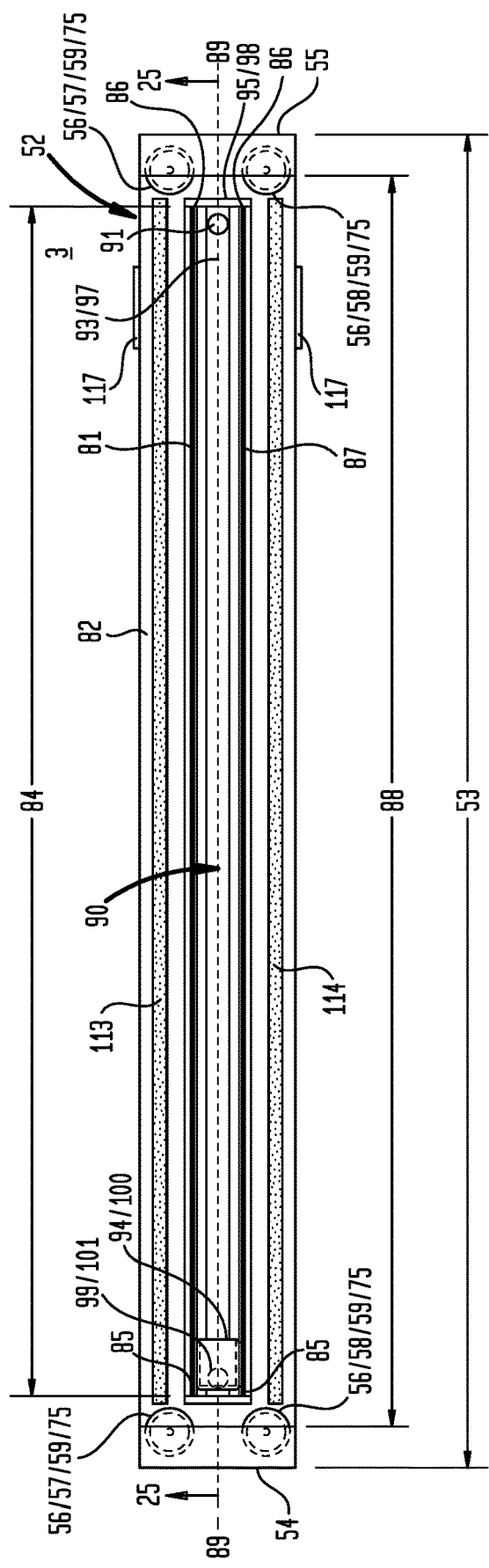
FIG. 19 is a bottom plan view of an embodiment of a panel maintenance assembly.
Figure 20:
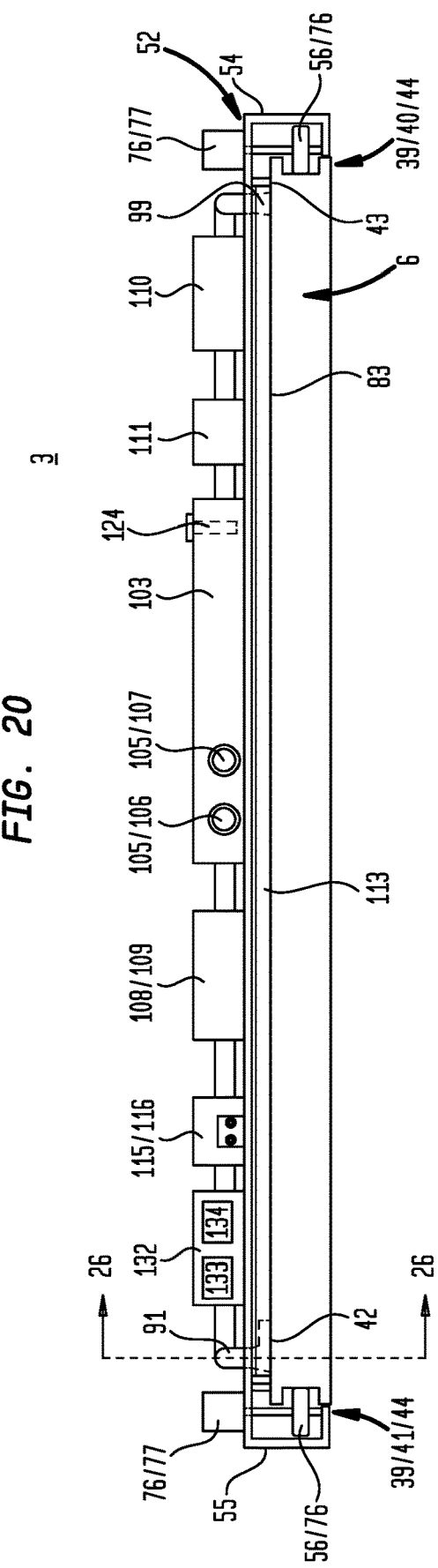
FIG. 20 is a first side elevation view of an embodiment of a panel maintenance assembly matably coupled to a panel module.
Figure 21:
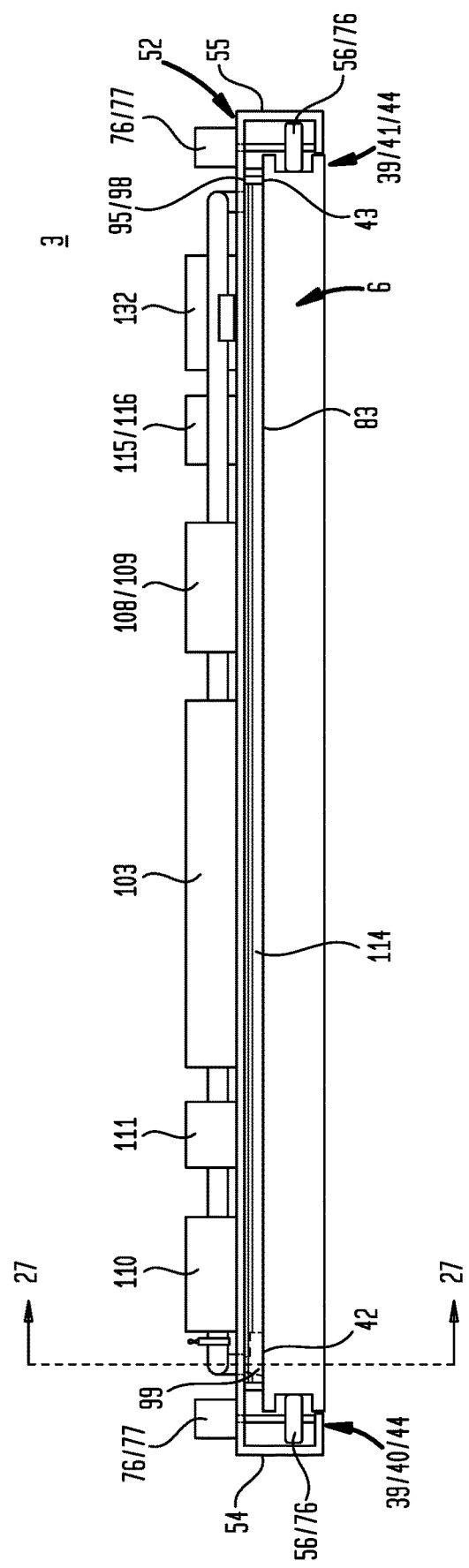
FIG. 21 is a second side elevation view of an embodiment of a panel maintenance assembly matably coupled to a panel module.
Figure 22:
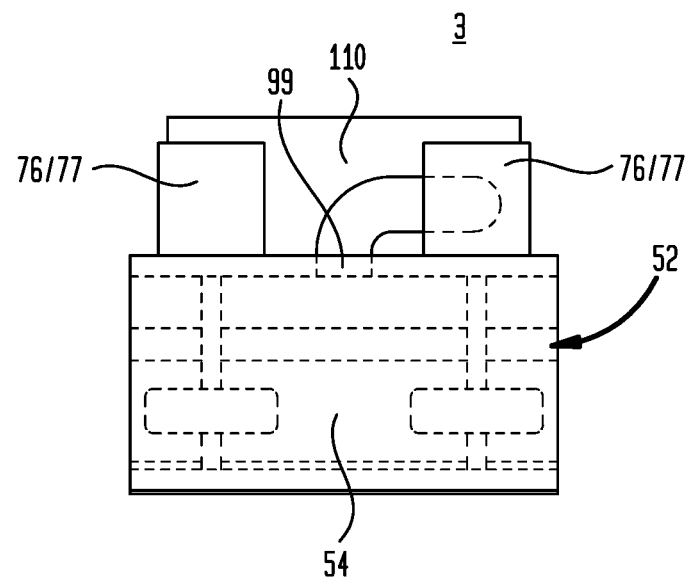
FIG. 22 is a first end elevation view of an embodiment of a panel maintenance assembly.
Figure 23:
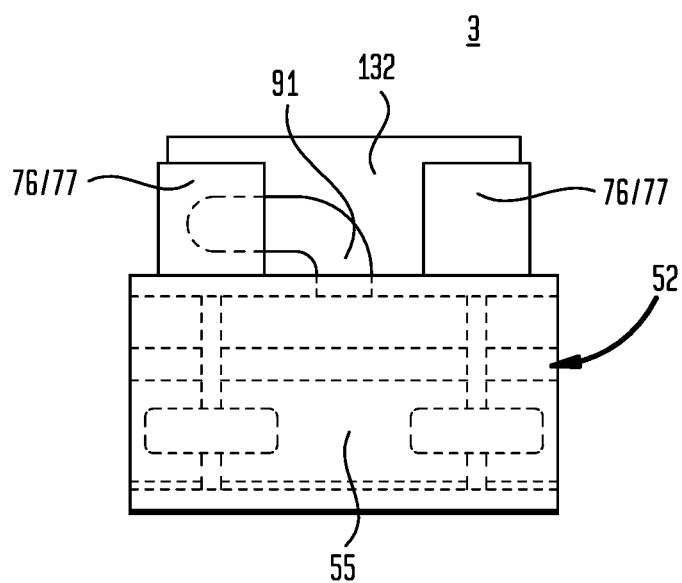
FIG. 23 is a second end elevation view of an embodiment of a panel maintenance assembly.
Figure 24:
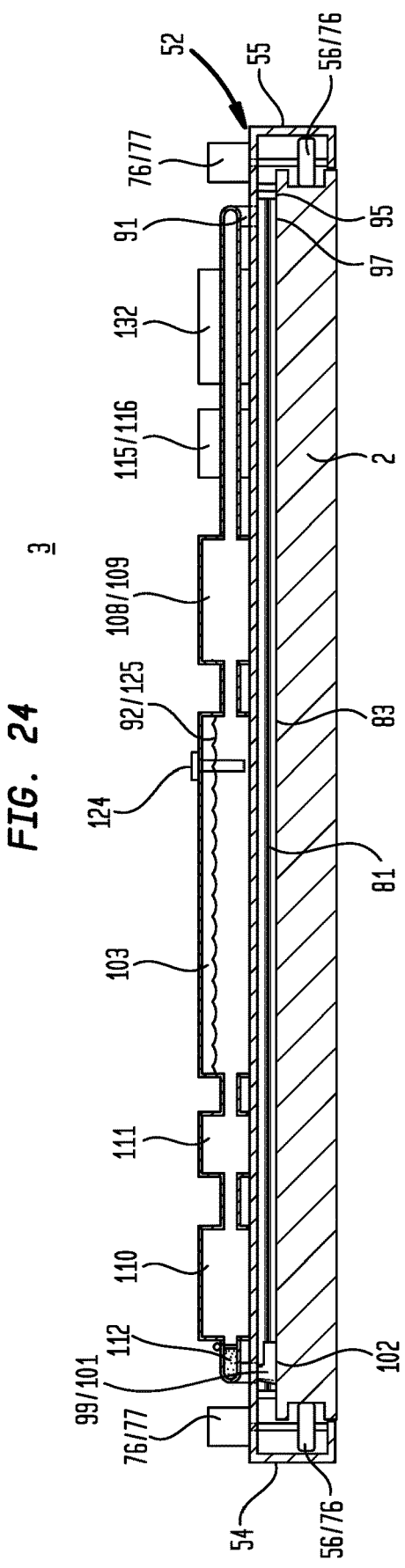
FIG. 24 is cross sectional view 24-24 of a first side elevation view of an embodiment of a panel maintenance assembly matably coupled to a panel module as shown in FIG. 17.
Figure 25:
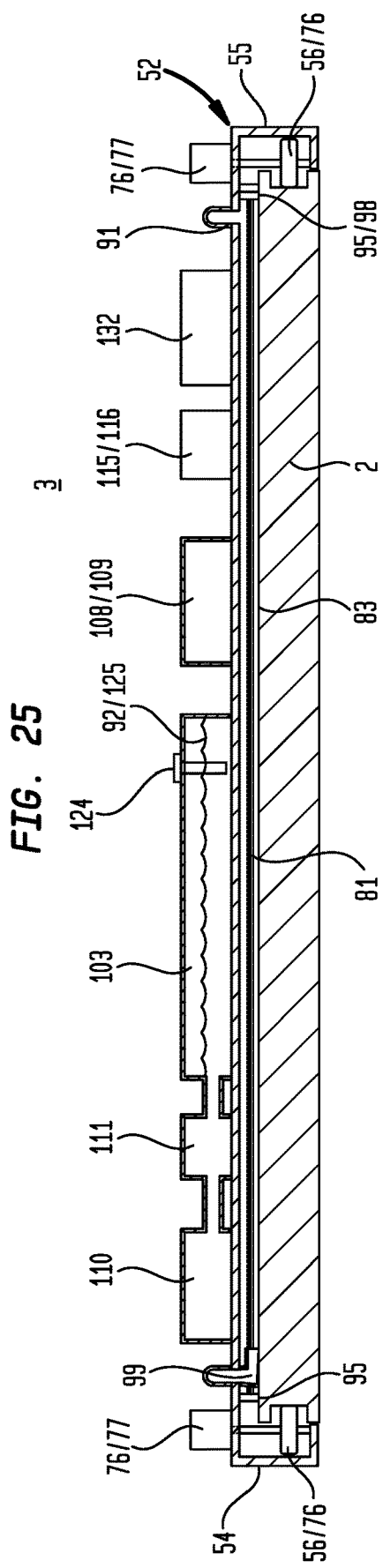
FIG. 25 is cross sectional view 25-25 of a first side elevation view of an embodiment of a panel maintenance assembly matably coupled to a panel module as shown in FIG. 19.
Figure 26:
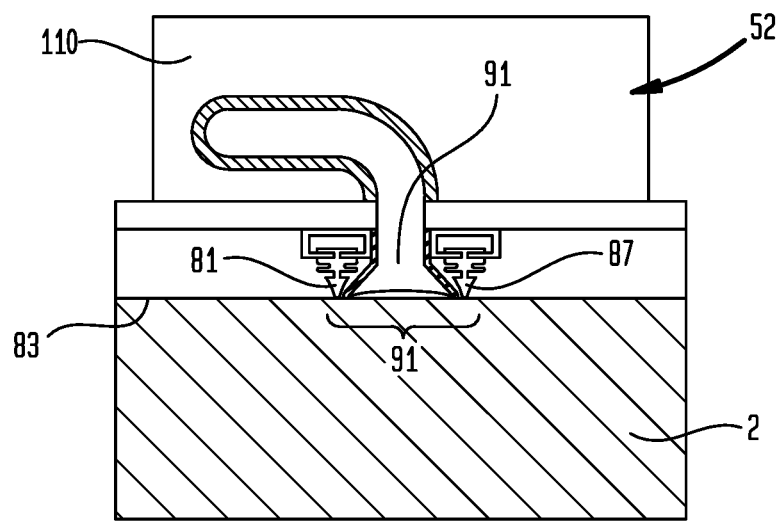
FIG. 26 is a cross sectional view 26-26 of a fluid outlet as shown in FIG. 20.
Figure 27:
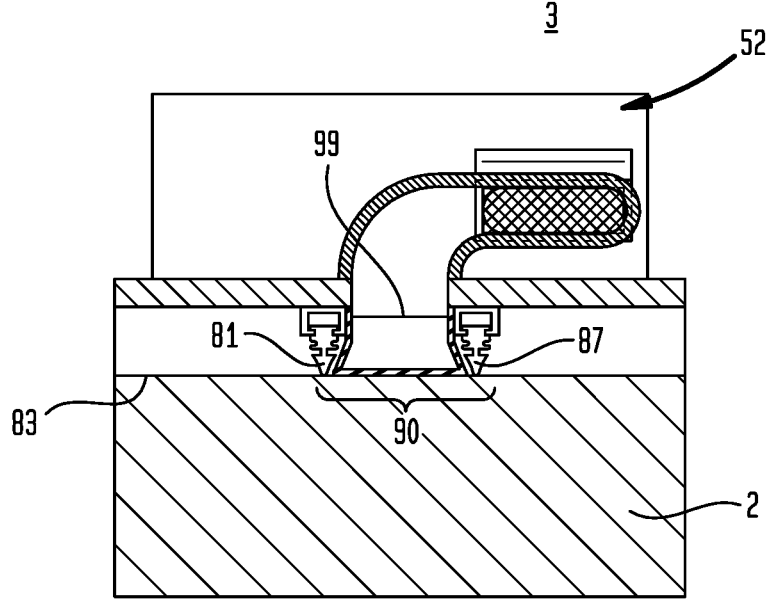
FIG. 27 is a cross sectional view 27-27 of a fluid outlet as shown in FIG. 21.

Now referring primarily to FIGS. 16 through 27, a first blade (81) can, but need not necessarily, be coupled to a first carriage face (82) of the carriage (52)(as shown in the example of FIGS. 19 and 26-27). The carriage (52) coupled to the first frame outer side (15), as above described, can move in relation to first panel (8) captured by the first frame (6) while maintaining a substantially fixed distance between the first carriage face (82) and the opposing first panel face (83) of the first panel (8). The first blade (81) can extend from the first carriage face (82) to contact the first panel face (83) allowing the first blade (81) to wipe across the first panel face (83) as the carriage (52) moves over the first panel (8). The first blade (81) can, but need not necessarily, be linear or substantially linear having a first blade length (84) disposed between first blade first and second ends (85)(86). As to particular embodiments, each of the first blade (81) first and second ends (85)(86) can be disposed proximate the corresponding carriage first and second ends (54)(55) such that the first blade (81) can, but need not necessarily, wipably contact the first panel face (83) between a pair of opposed frame members (42)(43).

A second blade (87) can, but need not necessarily, be coupled to the first carriage face (82). The second blade (87) can extend from the first carriage face (82) to contact the first panel face (83) allowing the second blade (87) to wipe across the first panel face (83) as the carriage (52) moves over the first panel (8). The second blade (87) can, but need not necessarily, be linear or substantially linear having a second blade length (88) disposed between second blade (87) first and second ends (85)(86). As to particular embodiments, each of the second blade first and second ends (85)(86) can be disposed proximate the corresponding carriage first and second ends (54)(55) such that the second blade (87) can, but need not necessarily, wipably contact the first panel face (83) between a pair of opposed frame members (42)(43). The first and second blade (81)(87) can be disposed along a longitudinal axis (89) of the first carriage face (82) a distance apart to allow each of the first and second blades (81)(87) to wipably contact the first panel face (83) between opposed frame members (42)(43). The first and second blades (81)(87) coupled to the carriage first face (82) a distance apart defines a blade bounded passage (90) enclosed by contact of the first and second blades (81)(87) with the first panel face (83).

The first and second blades (81)(87) (or a plurality of blades each coupled to the carriage first face (82)) can be produced from a variety of conventional elastomers to provide a sufficient amount of flexure to wipingly engage the first panel face (83). The elastomers can, but need not necessarily, include or consist of one or more of: general purpose rubber such as silicone base rubber, natural rubber, chloroprene rubber, dimethyl silicone raw rubber, methyl vinyl silicone raw rubber, methyl phenyl vinyl silicone raw rubber, fluorosilicone raw rubber, or the like. As one illustrative example the first or second blade (81)(87) can be similar to wipers by Bosch, Part No. 208820004 or by Watts Squeeges, 2000 Series.

Now referring primarily to FIGS. 17, 19 and 26, a fluid outlet (91) can be disposed to deliver an amount of fluid (92) to the first panel face (83) wipingly engaged by the first blade or the second blade (81)(87) (or a plurality of blades) as the carriage moves over the first panel (8). As to particular embodiments, the fluid outlet (91) can, but need not necessarily, be disposed to deliver an amount fluid (92) into the blade bounded passage (90) enclosed by contact of the first and second blades (81)(87) with the first panel face (83). As to those embodiments in which the first and second blades (81)(87) contact the first panel face (83) with the first and second blades (81)(87) having first and second ends (85)(86) corresponding disposed proximate opposed frame members (44)(45), the amount of fluid (92) can flow in contact with the first panel face (83) within the blade bound passage (90) between opposite passage ends (93)(94).

The amount fluid (92) delivered to the first panel face (83) can be any type of fluid compatible with the material(s) included in the first panel (8), first panel frame (6), panel maintenance assembly (3), or docking station (4). As illustrative examples, the amount of fluid (92) can include or consist of one or more of: water, alcohol, denatured alcohol, isopropanol, ethanol, methanol, mineral acids, hydrochloric acid, sulfuric acid, acetic acid, citric acid, sodium hydroxide, potassium hydroxide, sodium hypochlorite, ammonia, chelants, sodium bicarbonate, tetrachlorethylene, carbon dioxide, trisodium phosphate, acetone, amyl nitrate, xylene, anionic detergent, ionic detergent, zwitterionic detergent, or the like.

Now referring primarily to FIG. 19, a passage first end cap (95) can, but need not necessarily, be mounted between the first and second blades (81)(87) and adjacent the carriage first face (82) and disposed adjacent the first panel face (83) when the first and second blades (81)(87) contact the first panel face (83) to close or substantially reduce an open area (96) of the blade bound passage (90) at a passage first end (97). The fluid outlet (91) can, but need not necessarily, be disposed in the first passage end cap (95) or in the carriage (52) to deliver the amount of fluid (92) into the blade bound passage (90). As to a particular embodiment, the first passage end cap (95) can, but need not be a flange (98) extending from the carriage first face (82) proximate the carriage first end (54) toward the panel face (83). The first and second blade ends (85)(86) can abut the flange (98) to close or substantially reduce the open area of the blade bound passage (90) at the passage first end (97).

Now referring primarily to FIGS. 19, 25 and 27, a fluid collection element (99) can, but need not necessarily, be mounted between the first and second blades (81)(87) and adjacent the carriage first face (82) and disposed adjacent the first panel face (83) when the first and second blades (81)(87) contact the first panel face (83) to close or substantially reduce the open area of the blade bounded passage (90) at a passage second end (100). The fluid collection element (99) can be configured as fluid collection container (101) having a container open end (102) facing toward the passage first end (97) of the blade bounded passage (90). When the first and second blades (81)(87) engage the first panel face (83) a portion of the fluid collection container (101) can contact the first panel face (83) between the first and second blades (81)(87). The portion of the fluid collection container (101) contacting the first panel face (83) can resiliently flex to generate a seal against the first panel face (83) and to flex as the carriage (52) moves over irregularities in the first panel face (83) or in the first frame (6). An amount of fluid (92) delivered into the blade bounded passage (90) proximate the passage first end (97) can flow toward the passage second end (100). The amount of fluid (92) flowing through the blade bounded passage (90) can be captured in the fluid collection element (99) proximate the passage second end (100).

Now referring primarily to FIGS. 17, 20, 24 and 25, a fluid reservoir (103) can, but need not necessarily, be coupled to the carriage (52). The fluid reservoir (103) can contain an amount of fluid (92). As to particular embodiments, the fluid reservoir (103) can be mounted to a carriage second face (104) facing outward of the first panel face (83). The fluid outlet (91) can be can be fluidicly coupled to the fluid reservoir (103) to allow the amount fluid (92) to flow from the fluid reservoir (103) to the fluid outlet (91). The fluid reservoir (103) can, but need not necessary, include a fluid supply connector (105) having a fluid supply inlet and outlet ports (106)(107). An amount of fluid (92) can be introduced into the fluid reservoir (103) through the fluid supply inlet (106) and overfill of the amount of fluid (92) can egress from the fluid supply outlet port (107).

Now referring primarily to FIGS. 17, 20 and 21, a first fluid flow generator (108) can, but need not necessarily, be fluidicly coupled to the fluid flow reservoir (103) and the fluid outlet (91). The first fluid flow generator (108) can operate to generate a flow of an amount of fluid (92) from the fluid reservoir (103) to the fluid outlet (91) with sufficient fluid pressure for delivery from the fluid outlet (91) onto the first panel face (83). As an illustrative example, the first fluid flow generator (108) can be a positive displacement pump (109) similar to Cole-Parmer, Part No. GO 79600-06.

Again referring to FIGS. 17, 20 and 21, a second fluid flow generator (110) can, but need not necessarily, be fluidicly coupled to the fluid collection element (99) and the fluid reservoir (103). The second fluid flow generator (110) can operate to generate a flow of the amount of liquid (92) from the fluid collection element (99) to the fluid reservoir (103). As an illustrative example, the second fluid flow generator (110) can be similar to an ABS, Part No. 102EX1 DC12V DM-1BZ.

Now referring to FIGS. 24 and 27, a fluid filter (111) can, but need not necessarily, be disposed between the fluid collection element (99) and the second fluid generator (110) to remove particles (112) from the first amount of fluid (92) prior to delivery to the second fluid generator (110). As an illustrative example, the fluid filter (111) can be similar to Norgren, Part No. 4LF-010-0000.

Figure 16:
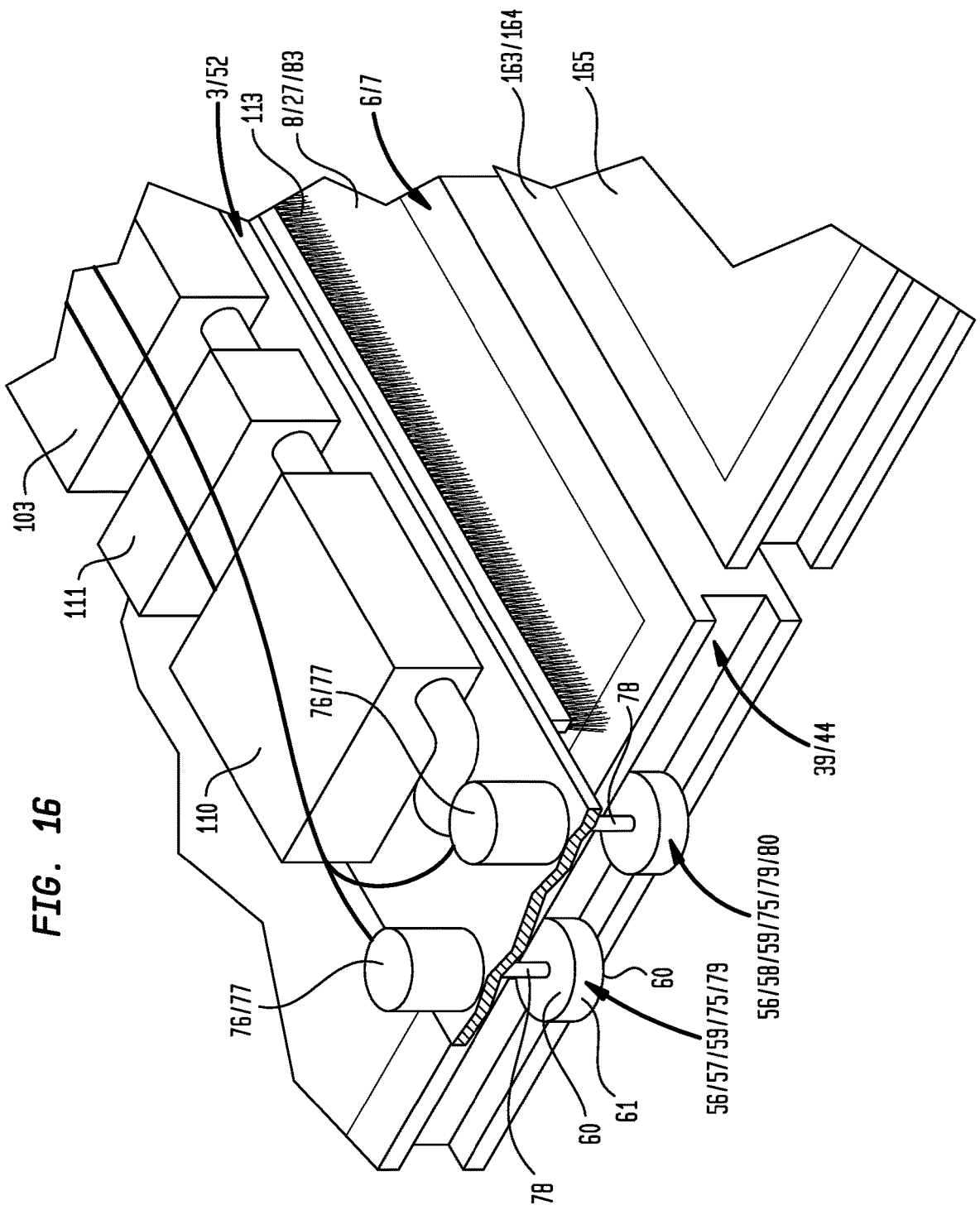
FIG. 16 is a perspective view of an embodiment of a frame outer side configured to include a track which matably engages the drive elements of a panel maintenance assembly including a sweeper.

Now referring primarily to FIGS. 16 and 19, a first sweeper (113) can, but need not necessarily, extend from the carriage first face (82) to contact the first panel face (83). The first sweeper (113) can extend, in whole or in part, between the carriage first and second ends (54)(55) to sweep the first panel face (83). As to particular embodiments a second sweeper (114) can, but need not necessarily, extend from the carriage first face (82) to contact the first panel (8). The second sweeper (114) can in whole or in part extend between the carriage first and second ends (54)(55) to sweep the first panel face (83). The first sweeper (113) or the second sweeper (114) can be disposed adjacent the first blade (81) or the second blade, or both whether inside the blade bounded passage (90) or outside the blade bounded passage (90). As shown in the illustrative example of FIG. 19, a first and second sweeper (113)(114) are correspondingly disposed adjacent a first blade (81) and a second blade (87) outside of the blade bound channel (18). Both of the first sweeper and second sweeper (113)(114) continuously extend between proximate the carriage first end (54) to proximate the carriage second end (55). A sweeper (113) (114) suitable for use with embodiments of the invention can be similar to Har-tru/Lee, Part No. 0100-136-3669.

Now referring primarily to FIGS. 17 and 20, a rechargeable power source (115) can be coupled to the carriage (52). The rechargeable power source (115) can be electrically coupled to one or more of the driver (76), the first fluid flow generator (108), or the second fluid flow generator (110) to supply power to one or more of these or other components. As to particular embodiments, the rechargeable power source (115) can be a five volt to twelve volt rechargeable battery (116). A rechargeable power source (115) suitable for use with embodiments of the invention can be similar to Tenergy, Part No. 11245.

Now again referring primarily to FIGS. 1, 17 and 21, a carriage position end limit sensor (117) can be coupled to the carriage (52) or the first frame (6) to sense first and second end limits (118)(119) of carriage (52) movement across the first panel (8). As to particular embodiments, the carriage position end limit sensor (117) can include an end limit switch (120) switchable from a first switch condition to a second switch condition by manual pressure due to engagement with a first or second end limit elements (121)(122) to electrically close or open a circuit to reverse direction of a drive element (75) or a driven tracker element (79). Removal of manual pressure can return the end limit switch (120) to the first switch condition. As to other embodiments, the carriage position end limit sensor (117) can include an end limit switch (120) switchable from a first switch condition to a second switch condition by sensing an applied magnetic field (123) generated by the first or second end limit elements (121)(122) to electrically close or open a circuit to reverse direction of a drive element (75) or a driven tracker element (79). These illustrative examples are not intended to preclude other embodiments of the carriage position end limit sensor (117) capable of generating reciprocal directional movement of the carriage (52) between the first and second end limits (118)(119) over the first panel (8).

Now referring primarily to FIGS. 1 and 24, a fluid level sensor (124) can, but need not necessarily, be fluidicly coupled to the fluid reservoir (103). The fluid level sensor (124) can operate to sense a fluid level (125) of the amount of fluid (92) in the fluid reservoir (103). An illustrative example, a fluid level sensor (124) similar to Uro, Part No. 17137524812 can be used with embodiments of the invention.

Now referring primarily to FIGS. 1 and 17, a light transmissivity sensor (126) or a light reflectivity sensor (127) can be coupled to the carriage (52) to sense an amount of light transmissivity or an amount of light reflectivity of the first panel (8). The light transmissivity sensor (126) can generate a light transmissivity signal (128) that varies based on amount of light transmissivity of the first panel (8) or the light reflectivity sensor (127) can generate a light reflectivity signal (129) that varies based on an amount of light reflected by the first panel (8). Each signal can be correspondingly transformed into a light transmissivity value (130) or a light reflectivity value (131) which can be compared to light transmissivity or light reflectivity threshold values (145) to initiate one or more of: movement of the carriage (52) over the first panel (8), delivery of an amount of fluid (92) from the fluid outlet (91) to the first panel (8), or operation of the first or second fluid flow generators (108)(110). As one illustrative example, a light reflectivity sensor (127) suitable for use in embodiments of the invention can be similar to an Omron, Part No. #EE-SPY301. A light transmissivity sensor (126) suitable for use with embodiments of the invention can be an Autonics, Part No. BYD30-DDT-T.

Now referring primarily to FIGS. 17 and 18, embodiments can but need not necessarily include, a controller (132) including a processor (133) coupled to a memory element (134). The memory element (134) can contain a panel maintenance program (135) executable to control movement of the carriage (52) over the first panel (8). As to particular embodiments, the panel maintenance program (135) can be executed to control operation of the driver (76) to generate movement of the carriage (52) over the first panel (8) based on exceeding one or more threshold values including or consisting of: an elapsed time threshold value (141), a fluid level threshold value (143), a light transmissivity threshold value (144), a light reflectivity threshold value (145), a first light transmissivity threshold value (146), first light reflectivity threshold value (147), a second light transmissivity threshold value (148), second light reflectivity threshold value (149), an energy level threshold value (153) relating to one or a combination of: an elapsed amount of time (136), an amount of light transmissivity (137) of the first panel (8), an amount of light reflectivity (138) of the first panel (8), an amount of energy (152) remaining in the rechargeable power source (115), or an amount of fluid (92) remaining in the fluid reservoir (103).

Accordingly, as to particular embodiments, the controller (132) can further include a timer (140) and the panel maintenance program (135) can be executed to periodically analyze an elapsed amount of time (136) from occurrence of the prior movement of the carriage (52) over the first panel (8). The panel maintenance program (135) can be further executed to compare the elapsed amount of time (136) from occurrence of the prior movement of the carriage (52) to an elapsed time threshold value of (141) for carriage movement. Where the elapsed time threshold value (141) for carriage movement has been exceeded, the panel maintenance program (135) can be further executed to generate movement in the carriage (52) over the first panel (8). As to those embodiments inclusive of sweepers (113)(114), movement of the carriage (52) results in sweepable engagement of the sweepers (113)(114) with the first panel face (83) to displace foreign matter ( ) such as: snow, rain, leaves, paper, particulates, or other debris from the first panel surface (83).

The panel maintenance program (135) can be further executed to compare the elapsed amount of time (136) from occurrence of the prior operation of the first or second fluid flow generators (108)(110) to an elapsed time threshold value of (141) for fluid delivery to the first panel (8). Where the elapsed time threshold value (141) for fluid delivery to the first panel (8) has been exceeded, the panel maintenance program (135) can further executed to operate the first or second fluid flow generators (108)(110) to deliver an amount of fluid (92) to the first panel face (83) and coordinate movement in the carriage (52) over the panel ( ). As to those embodiments inclusive of a first or second blade (81)(87), delivery of an amount of fluid (92) to the first panel face (83) and movement of the carriage (52) results in wipable engagement of the first or second blades (81)(87) with the first panel face (83) to displace the amount of fluid (92) delivered to the first panel face (83) and displace foreign matter ( ) such as: snow, rain, leaves, paper, particulates, or other debris from the first panel face (83).

The panel maintenance program (135) can be further executed to continuously or periodically analyze a fluid level signal (142) from a fluid level sensor (124) to determine a fluid level (125) remaining in the fluid reservoir (103). As to particular embodiments, the panel maintenance program (135) can be further executed to compare the fluid level (125) to a fluid level threshold value (143), and where the fluid level threshold value (143) has been exceeded, prohibit delivery, or reduce the amount of fluid (92) delivered, from the fluid outlet (91) onto the first panel face (83).

The panel maintenance program (135) can be further executed to continuously or periodically analyze the light transmissivity signal (128) from the light transmissivity sensor (126) or light reflectivity signal (129) from the light reflectivity sensor (127)(or both) to determine a light transmissivity value (130) or light reflectivity value (131)) of the first panel (8). As to particular embodiments, the panel maintenance program (135) can be further executed to compare the light transmissivity value (130) or the light reflectivity value (131) to one or more light transmissivity threshold value (144) or light reflectivity threshold value (145), and for example, where a first light transmissivity threshold value (146) or first light reflectivity threshold value (147) has been exceeded generate movement of the carriage (52) to sweep the first panel face (83), and where a second light transmissivity threshold value (148) or second light reflectivity threshold value (149) has been exceeded deliver an amount of fluid (92) onto the first panel face (83) coordinated with movement of the carriage (52) to wipably remove the amount of fluid (92) from the first panel face (83).

The panel maintenance program (135) can be further executed to continuously or periodically analyze an energy sensor signal (150) from and energy level sensor (151) electrically coupled to the rechargeable battery (116) to determine an energy level (152) remaining in the rechargeable battery (116). As to particular embodiments, the panel maintenance program (135) can be further executed to compare the energy level value (152) to an energy level threshold value (153) and where the energy level threshold value (153) has been exceeded prohibit or reduce the amount of movement of the carriage (52) or prohibit or reduce the amount of fluid (92) delivered from the fluid outlet (91) onto the first panel (8).

Now referring primarily to FIG. 1, the panel maintenance system (1) can, but need not necessarily include, a docking station (4) which interfaces with the panel maintenance assembly (3). As to particular embodiments, the docking station (4) can be disposed in relation to the first frame (6) to allow the carriage (52) to move over the first panel (8) and dock with the docking station (4) to engage matable portions of the fluid supply connector (105). As to particular embodiments, the fluid reservoir inlet and outlet ports (106)(107) of the fluid reservoir (103) can be configured to achieve an open condition (155) only upon mated engagement with the docking station inlet and outlet ports (156)(157). Separation of the fluid reservoir inlet and outlet ports (106)(107) and the docking station inlet and outlet ports (156)(157) can achieve the closed condition (158) of the fluid reservoir inlet and outlet ports (106)(107) and the docking station inlet and outlet ports (156)(157). Particular embodiments of the docking station (4) can further include matable portions of a power supply connector (159)(160) which matably engage when the carriage (52) docks with the docking station.

Again referring primarily to FIGS. 1 and 18, the panel maintenance program (135) can be further executed to continuously or periodically analyze the fluid level (125) in the fluid reservoir (103) or the energy level (152) remaining in power source (115) and based on comparison of the amount of fluid remaining in said fluid reservoir (103) or the amount of energy (139) remaining in the power source (115) to a fluid level threshold value (143) or an energy level threshold value (153) to cause the carriage (52) to dock with the docking station (4) to supply an amount of fluid (92) or recharge the rechargeable power source (115).

Now referring primarily to FIGS. 1 and 10, the panel maintenance system (1) can, but need not necessarily, include a second frame (163) including a second plurality of frame members (164) joined to enclose a second panel (165). The second plurality of frame members (164) can include a second frame inner side (166) configured to capture the second panel (165) within said second frame (163) and a second frame outer side (167) configured to provide a second track (168) axially extending between first and second ends (10)(11) of at least one of the second plurality of frame members (164). The second track (168) can be configured as above explained to engage a tracking element (56) or a drive element (75) to move the carriage (52) over the second panel (165).

The term second frame (163) is intended to mean one additional frame or a plurality of frames depending upon the application. As to particular embodiments, the first and second frames (6)(163) can be disposed a distance apart (169) with said first and second tracks (39)(168) axially aligned but discontinuous between the first and second frames (6)(163). As to these embodiments, the drive element (75) can comprise a pair of drive elements (183)(184) coupled proximate carriage first and second ends (54)(55), as above described, to engage the first track (39) a distance apart sufficient to allow a first one of the pair of drive elements (183) to drive the carriage (52) to a location over the first panel (8) at which a second one of the pair of drive elements (184) can engage the second track (168) of the second frame (163). The second one of the pair of drive elements (184) can operably engage the second track (168) to draw the carriage (52) over the distance between the first and second frames (6)(163).

Again referring primarily to FIGS. 1 and 10, an embodiment including a first and second frame (6)(163) can further include a track bridge (170) disposed to span the distance between the first and second tracks (39)(168). The track bridge (170) can be configured to engage a drive element (75) to move the carriage (52) between the first track (39) and the second track (168).

As can be easily understood from the foregoing, the basic concepts of the present invention may be embodied in a variety of ways. The invention involves numerous and varied embodiments of a panel maintenance system and methods for making and using such panel maintenance system including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "wiper" should be understood to encompass disclosure of the act of "wiping"—whether explicitly discussed or not—and, conversely, were there effectively disclosure of the act of "wiping", such a disclosure should be understood to encompass disclosure of a "wiper" and even a "means for door wiping." Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the reciprocally telescoping door stops herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

I claim:

1. A panel maintenance system, comprising:
   a panel maintenance assembly having a drive element which moves said panel maintenance assembly over a panel;
   a fluid reservoir carried by said panel maintenance assembly;
   a fluid pump carried by said panel maintenance assembly, said fluid pump operable to generate a flow of fluid from said fluid reservoir; and
   a fluid outlet disposed on said panel maintenance assembly, said fluid outlet adapted to deliver said fluid onto said panel;
   a fluid collection element coupled to said panel maintenance assembly, said fluid collection element configured to collect said fluid delivered onto said panel; and
   a second fluid pump carried by said maintenance assembly, said second fluid pump operable to return said amount of fluid collected by said fluid collection element to said fluid reservoir.

2. The system of claim 1, further comprising a fluid filter disposed between the fluid collection element and the second fluid pump to remove particles from said fluid prior to delivery to the second fluid pump.

3. The system of claim 1, further comprising a first blade coupled to said panel maintenance assembly, said first blade extending from said panel maintenance assembly to contact said panel.

4. The system of claim 3, further comprising a second blade coupled to said panel maintenance assembly, said second blade extending from said panel maintenance assembly to contact said first panel at a distance from said first blade, said fluid outlet located to deliver said fluid onto said panel in a blade bounded passage between said first and second blades.

5. The system of claim 4, wherein said fluid collection element is located to collect said fluid delivered onto said panel in a blade bounded passage between said first and second blades.

6. The system of claim 5, further comprising a first sweeper coupled to said panel maintenance assembly, said sweeper extending from said panel maintenance assembly to contact said first panel.

7. The system of claim 6, further comprising a second sweeper coupled to said panel maintenance assembly, said second sweeper extending from said panel maintenance assembly to contact said first panel at a distance from said first sweeper.

8. The system of claim 7, wherein said first and second sweepers disposed on said panel maintenance assembly adjacent sides of said first and second blade outside of said blade bounded passage.

9. The system of claim 1, further comprising a fluid level sensor fluidicly coupled to said fluid reservoir, said fluid level sensor sensing a fluid level of said amount of fluid in said fluid reservoir.

10. The system of claim 1, further comprising a rechargeable power source coupled to said panel maintenance assembly, said rechargeable power source electrically coupled to one or more of said driver, said first fluid pump, and said second fluid pump.

11. The system of claim 1, further comprising a panel sensor coupled to said panel maintenance assembly, said panel sensor configured to sense an amount of light transmissivity of said first panel or an amount of light reflectivity of said first panel, said panel sensor generating a panel sensor signal that varies based on said amount of light transmissivity or light reflectivity of said first panel.

12. The system of claim 1, further comprising a controller including a processor coupled to a memory element, said memory element containing a panel maintenance program executable to control said driver to generate movement of said panel maintenance assembly over said panel between sensed first and second end limits.

13. The system of claim 12, wherein said panel maintenance program is further executable to operate said first fluid pump to deliver said amount of fluid through said fluid outlet onto said panel.

14. The system of claim 13, wherein said panel maintenance program is further executable to operate said second fluid pump to return said amount of fluid collected by said fluid collection element to said fluid reservoir.

15. The system of claim 9, further comprising a controller including a processor coupled to a memory element, said memory element containing a panel maintenance program executable to periodically determine said amount of fluid remaining in said fluid reservoir.

16. The system of claim 10, further comprising a controller including a processor coupled to a memory element, said memory element containing a panel maintenance program executable to periodically determine an amount of energy remaining in said power source.

17. The system of claim 11, further comprising a controller including a processor coupled to a memory element, said memory element containing a panel maintenance program executable to control said driver to generate movement of said panel maintenance assembly over said panel based on comparison of said light transmissivity value or said light reflectivity value to pre-selected light transmissivity threshold value or light reflectivity threshold value, wherein exceeding said light transmissivity threshold value or said light reflectivity threshold value causes movement of said panel maintenance assembly over said first panel.

18. The system of claim 16, wherein said panel maintenance program is further executable to dock said panel maintenance assembly with a docking station based on occurrence of an energy level remaining in said power source exceeding an energy level threshold or based on occurrence of a fluid level remaining in said fluid reservoir exceeding a fluid level threshold value.

19. The system of claim 18, wherein said docking station to which said panel maintenance assembly docks correspondingly including matable portions of a fluid supply connector or matable portions of a power supply connector.

* * * * *